United States Patent [19]

Turner

[11] Patent Number: 5,006,973
[45] Date of Patent: Apr. 9, 1991

[54] AUTOTUNED RESONANT POWER SOURCE

[75] Inventor: James B. Turner, Bothell, Wash.

[73] Assignee: The Boeing Company, Seattle, Wash.

[21] Appl. No.: 500,745

[22] Filed: Mar. 28, 1990

[51] Int. Cl.$^5$ .............................................. H02M 5/40
[52] U.S. Cl. ........................................ 363/34; 363/36;
363/37; 363/79; 363/95; 323/211
[58] Field of Search ....................... 363/34, 36, 37, 79,
363/95, 97, 98, 131; 323/210, 211

[56] References Cited

U.S. PATENT DOCUMENTS

| | | | |
|---|---|---|---|
| 3,703,680 | 11/1972 | Frank et al. | 323/210 |
| 4,066,954 | 1/1978 | Vukasovic | 363/37 |
| 4,234,843 | 11/1980 | Gyugy et al. | 323/210 |
| 4,385,348 | 5/1983 | Wisner | 363/37 |
| 4,428,078 | 1/1984 | Kuo | 340/310 A |
| 4,672,300 | 6/1987 | Harper | 363/97 |
| 4,866,592 | 9/1989 | Fujii et al. | 363/36 |
| 4,885,675 | 12/1989 | Henze et al. | 323/211 |
| 4,903,181 | 2/1990 | Seidel | 323/210 |

Primary Examiner—Steven L. Stephan
Assistant Examiner—Jeff Sterrett
Attorney, Agent, or Firm—Christensen, O'Connor, Johnson & Kindness

[57] ABSTRACT

A resonant, quasi-square wave, pulse width modulated (PWM) power source (33) for a connectorless power system is disclosed. The power source (33) supplies constant amplitude, fixed-frequency current to a supply loop (31) that is inductively coupled to a plurality of pickup loops (35), each of which supplies power to a remote unit, such as the seat regulator that supplies power to a group of commercial airplane seats (37). Precise, fixed-frequency control is provided by triggering a PWM with fixed-frequency sync pulses. Current control is provided by sensing the current applied to the supply loop, converting the magnitude of the sensed current to a voltage and using the voltage to control the width of the pulses produced by the PWM. The PWM pulses, in turn, control the width of the power pulses applied by the power source (33) to the supply loop (31). Stability and efficiency are improved by maintaining the output of the power source nearly resonant, i.e., maintaining the phase angle between the output voltage and current low. This is accomplished by determining the phase angle between the output voltage and current and using the result to control the magnitude of capacitance connected in series with the supply loop.

9 Claims, 17 Drawing Sheets

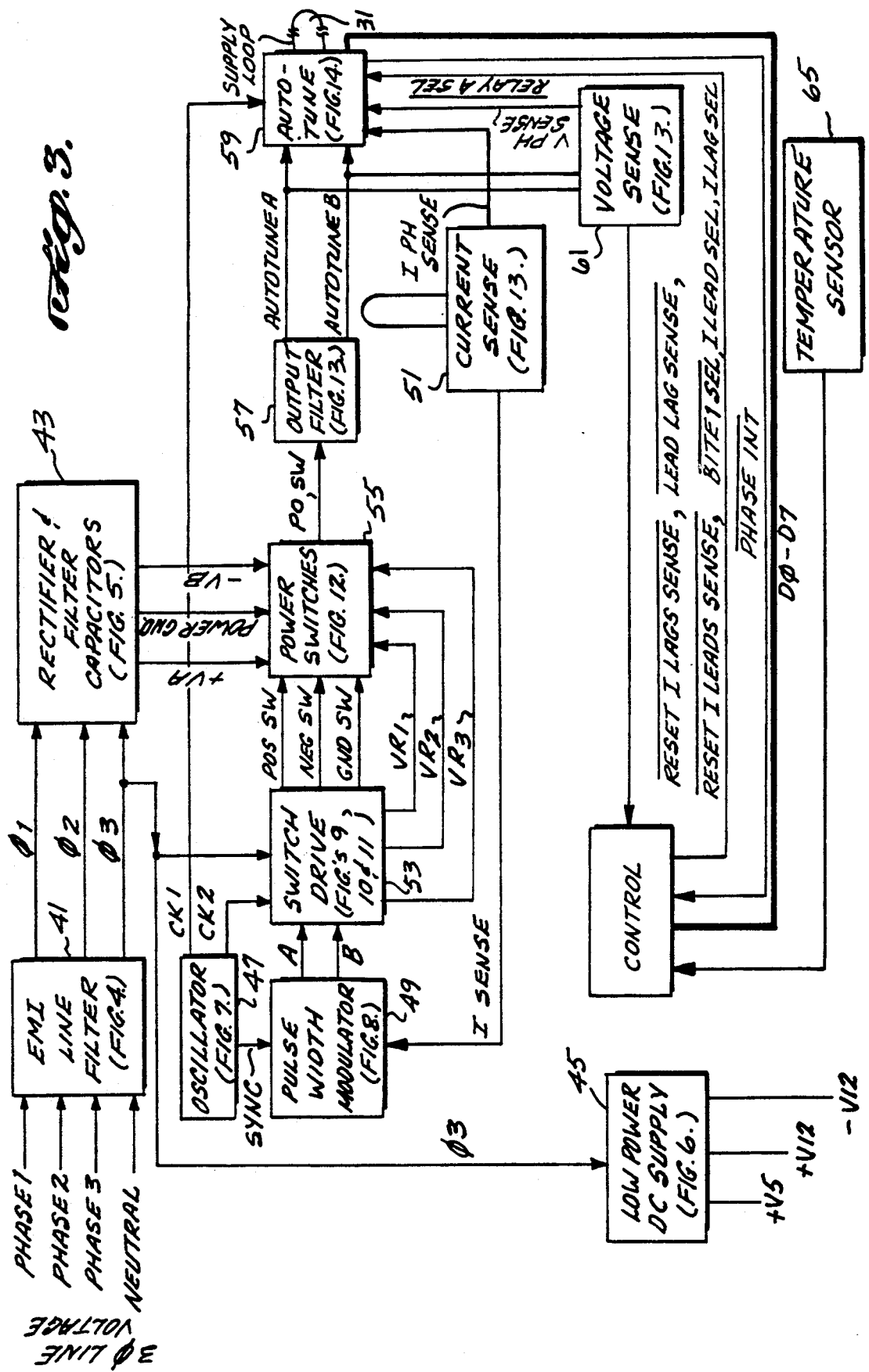

AUTOTUNED RESONANT POWER SOURCE

TECHNICAL AREA

This invention relates to power sources and, more particularly, power sources for connectorless power systems.

BACKGROUND OF THE INVENTION

When ordering commercial aircraft, airline companies often specify a number of design options to the manufacturer, including passenger seating layouts. The manufacturing inventory costs associated with providing different seating arrangements and spacing between seats can be significant. These costs will become more important to the next generation of aircraft, which will offer new personal entertainment and service facilities to each passenger. Designers of such facilities are planning to install an entertainment system and passenger service system in the back of each aircraft seat for use by the passenger in the following seat. In order to supply power to these facilities, conventional wiring techniques will typically require that each different seating arrangement that an airline company specifies have a different length power lead harness. The cost and weight penalty associated with providing power for each seat using conventional wiring techniques is likely to be unacceptable to most passenger carriers. In addition to unacceptable costs in terms of weight, conventional wiring techniques inhibit the ability to rearrange classes of seating (by sliding seats to change seating pitch) in order to optimize the payload return on a flight (even within 30 minutes of departure). The ability to rearrange classes of seating on a short-term basis is a profitable feature that is desired by most airlines.

An alternative to wiring each seat to a power source utilizing a conventional power lead harness is disclosed in commonly assigned U.S. Pat. No. 4,428,078 (C. Kuo). This patent discloses what is referred to therein as a "wireless" system for supplying power to a plurality of multiple-turn pickup coils disposed in the base of seats throughout an aircraft cabin. Perhaps this technology could more accurately be described as a "connectorless" power supply system, because power is inductively coupled from a power supply loop that is disposed in the floor of an aircraft cabin to pickup coils attached to each seat group. The power is used to operate the passenger entertainment and service systems installed in the seats. This wireless system permits seats to be moved about in different arrangements as required by individual airline carriers, without concern for providing different length interconnecting wire harnesses.

In order for a connectorless power supply system to be practical in an aircraft environment, the system power source must meet certain criteria. The power source must have: (i) high efficiency (in order to maintain power dissipation low); (ii) very tight frequency regulation; (iii) reasonably well-regulated current amplitude over load and line variations; (iv) low weight; (v) low output and input wiring harmonic fluctuations; and (vi) high reliability. Furthermore, the power source must be producible for a reasonable cost and be fairly easy to manufacture.

High efficiency is mandated by the maximum allowable power dissipation in certain size enclosures dictated by present commercial aircraft specifications (ARINC 600). For an eight MCU enclosure, power dissipation must be less than 200 watts with forced air cooling. As a result, power dissipation is the requirement that must be met, not efficiency per se.

Fixed frequency is required because variable frequency would require autoresonating in the seat regulators of the aircraft, which adds cost and weight. More specifically, since a modern commercial aircraft has many seats, typically, many seat regulators are required. As a result, the weight and cost of seat regulators is a significant factor when it comes to choosing a power supply system. Varying frequency has the further disadvantage of causing interference with the RF transmission (and eventually the audio system) of an entertainment and service system. Because such interference will vary in an unpredictable fashion, its elimination is expensive and, therefore, undesirable.

The constant amplitude current requirement is also designed to make it easier for the seat regulators to maintain a constant DC output voltage. More specifically, the voltage induced in pickup coils is proportional to the current in a supply loop. If the supply loop current is maintained at a constant amplitude, the voltage induced at the pickup coils is relatively constant, whereby the job of the seat regulator to maintain a constant DC output voltage is eased. Contrariwise, if constant voltage is used as the power source requirement, the primary impedance associated with one seat pickup coil would consist of not only the power source output impedance and the supply loop inductance but also the impedances of all the other seat pickup units in the system. Because the impedances of the pickup units can vary widely, because required power can vary over a wide range as powered items (e.g., TVs) are turned on and off, the variation in pickup unit impedance would appear as a variation in source impedance. A varying source impedance increase would make it very difficult and, thus, more expensive for the seat regulators to maintain a constant output voltage.

A further factor that needs to be taken into consideration is the fact that contemporary aircraft power supplies generate 400 Hz power. An unacceptable number of supply loop and pickup coil turns are required to provide adequate power to seat regulators at 400 Hz. In order to reduce the number of turns in the supply loop and the pickup loop to an acceptable level, the 400 Hz power created by contemporary aircraft generators must be changed to a higher frequency. Obviously, too high a frequency cannot be chosen because of EMI considerations. More specifically, while higher frequencies increase the efficiency of a connectorless power supply system, in a commercial aircraft, the chosen fundamental frequency and, preferably, the third harmonic of the fundamental frequency must be below the frequency bands of the automatic direction finder and other navigation systems of the aircraft. In the past, 38 KHz was picked as a frequency low enough to avoid the EMI problem and to allow synchronization with the FM pilot of FM entertainment systems. The preferred embodiment of the present invention was designed based on using this frequency, i.e., 38 KHz, as the fundamental power switching frequency.

SUMMARY OF THE INVENTION

In accordance with this invention, a resonant, quasi-square wave, pulse width modulated (PWM) power source for a connectorless power system is disclosed. The power source supplies constant amplitude, fixed-frequency current to a supply loop that is inductively coupled to a plurality of pickup loops, each of which supplies power to a remote unit, which can have widely varying power requirements. Precise, fixed-frequency control is provided by triggering a PWM with fixed-frequency sync pulses. Current control is provided by sensing the current applied to the supply loop, converting the magnitude of the sensed current to a voltage and using the voltage to control the width of the pulses produced by the PWM. The PWM pulses, in turn, control the width of the power pulses applied by the power source to the supply loop. Stability and efficiency are improved by maintaining the output of the power source resonant, i.e., maintaining the phase angle between the output voltage and current low. This is accomplished by determining the phase angle between the output voltage and current and using the result to control the magnitude of capacitance connected in series with the supply loop.

The preferred form of the present invention receives power, preferably three-phase power at a fixed frequency (e.g., 400 Hz). The three-phase power is rectified, filtered, and the resultant DC power supplied to power switches. An oscillator provides sync pulses to a PWM circuit that, via a switch drive circuit, controls the opening and closing of the power switches. The output of the power switches is filtered and applied via an autotune circuit to the supply loop. The autotune circuit receives signals denoting the phase of the current and voltage components of the power applied to the supply loop. The phase angle or difference is determined and used to control counters that count fixed-frequency clock pulses. The count values, which relate to the current/voltage phase angle, are used by a control circuit to control the open/closed status of a plurality of relays that, in turn, control the amount of capacitance connected in parallel with the supply loop.

As will be readily appreciated from the foregoing description, the invention provides a resonant, quasi-square wave, pulse width modulator (PWM) power source for a connectorless power system. The power source produces constant amplitude, fixed-frequency current. Stability and efficiency are maintained by making the power source resonant, i.e., maintaining the phase angle between the voltage and current components of the output power low.

BRIEF DESCRIPTION OF THE DRAWINGS

The foregoing objects and many of the attendant advantages of this invention will become more readily appreciated as the same become better understood by reference to the following detailed description when taken in conjunction with the accompanying drawings wherein:

FIG. 3 is a block diagram of a power source formed in accordance with the invention;

DESCRIPTION OF THE PREFERRED EMBODIMENT

Figure 1:
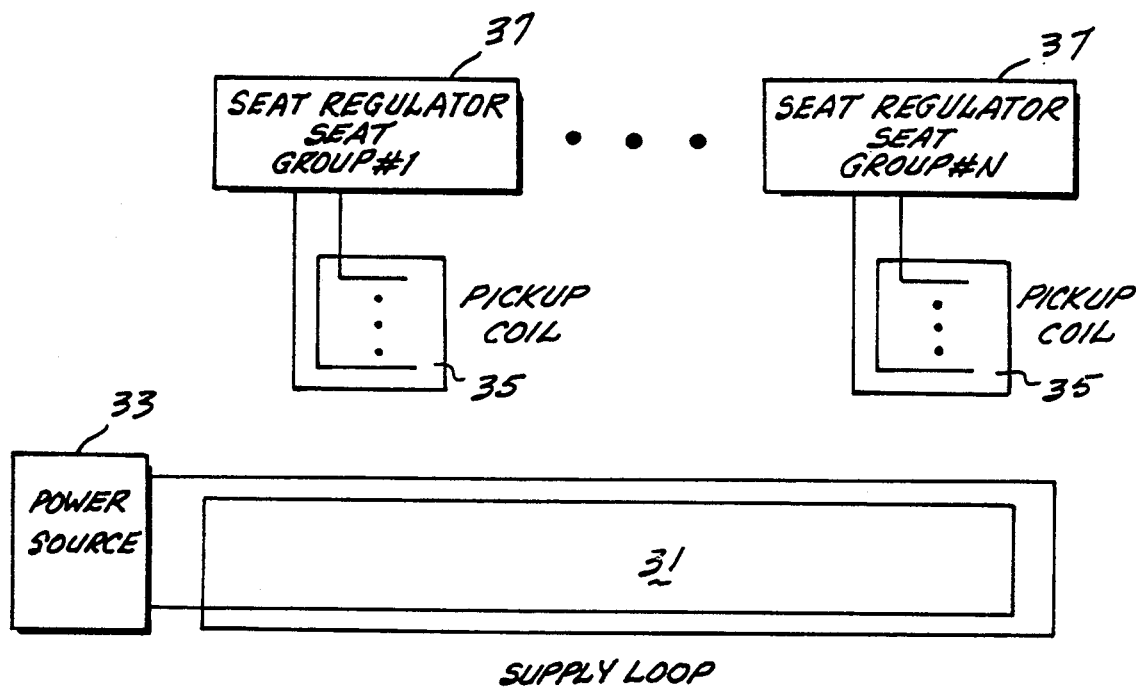
FIG. 1 is a pictorial diagram illustrating a power system incorporating a resonant power source formed in accordance with the invention.

FIG. 1 illustrates a connectorless power system with which a power source formed in accordance with the invention is useful. More specifically, FIG. 1 illustrates a supply loop 31 coupled to a power source 33 formed in accordance with the invention. FIG. 1 also illustrates a plurality of pickup coils 35, each coupled to a seat regulator 37 suitable for supplying power to a group of seats, such as three abreast aircraft seats commonly used in the cabin of a commercial airplane. The supply loop 31 and the pickup coils 35 are positioned such that current flow in the supply loop 31 is inductively coupled to the pickup coils 35. As a result, power produced by the power source 33 is conveyed in a "connectorless" manner to the seat regulators 37 via the supply loop 31 and the pickup coils 35.

Figure 2A:
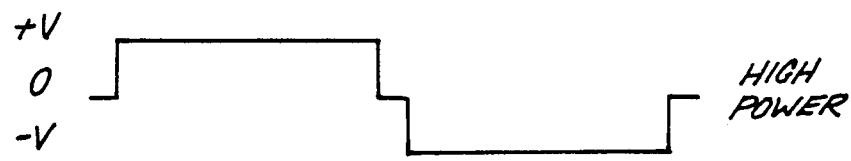
FIGS. 2a, 2b, and 2c are a series of waveform diagrams illustrating the waveform of power produced by switching the power switches of a power source formed in accordance with the invention to meet different power requirements.
Figure 2B:
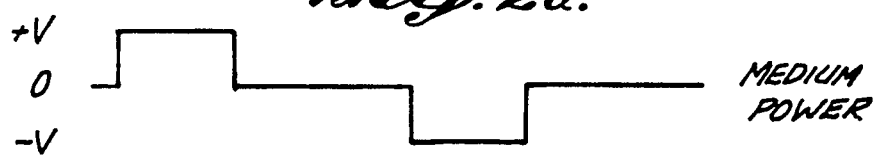
Figure 2C:

As illustrated in FIG. 2, and in accordance with the invention, the power source 33 produces a quasi-square wave pulse width modulated (PWM) power pulses. When high power is required by the seat regulators due to passengers having turned on large power requirement devices, such as TVs, the quasi-square wave pulses are relatively wide, as shown in the first line of FIG. 2. For decreased power requirements, the width of the quasi-square pulse decreases to a medium level, as shown in line 2 of FIG. 2, or to a low level, as shown in line 3 of FIG. 2.

FIG. 3 is a block diagram illustrating a preferred embodiment of a power supply formed in accordance with the invention for supplying power to a connectorless power system of the type illustrated in FIG. 2. As shown in FIG. 3, the phase 1, phase 2, phase 3, and neutral lines of a three-phase line voltage source are connected to an EMI line filter circuit 41. As will be better understood from the following description of the EMI line filter circuit illustrated in FIG. 4, the EMI line filter circuit filters the three-phase line voltage and produces filtered $\phi 1$, $\phi 2$, and $\phi 3$ voltages. The $\phi 1$, $\phi 2$, and $\phi 3$ voltages are applied to a rectifier and filter capacitor circuit 43. As will be better understood from the following description of the rectifier and filter capacitor circuit illustrated in FIG. 5, the rectifier and filter capacitor circuit rectifies the $\phi 1$, $\phi 2$, and $\phi 3$ voltages and produces positive and negative DC voltages designated +VA and −VB, respectively, relative to power ground. +VA, −VB, and power ground are connected to a power switch circuit 55.

Figure 6:
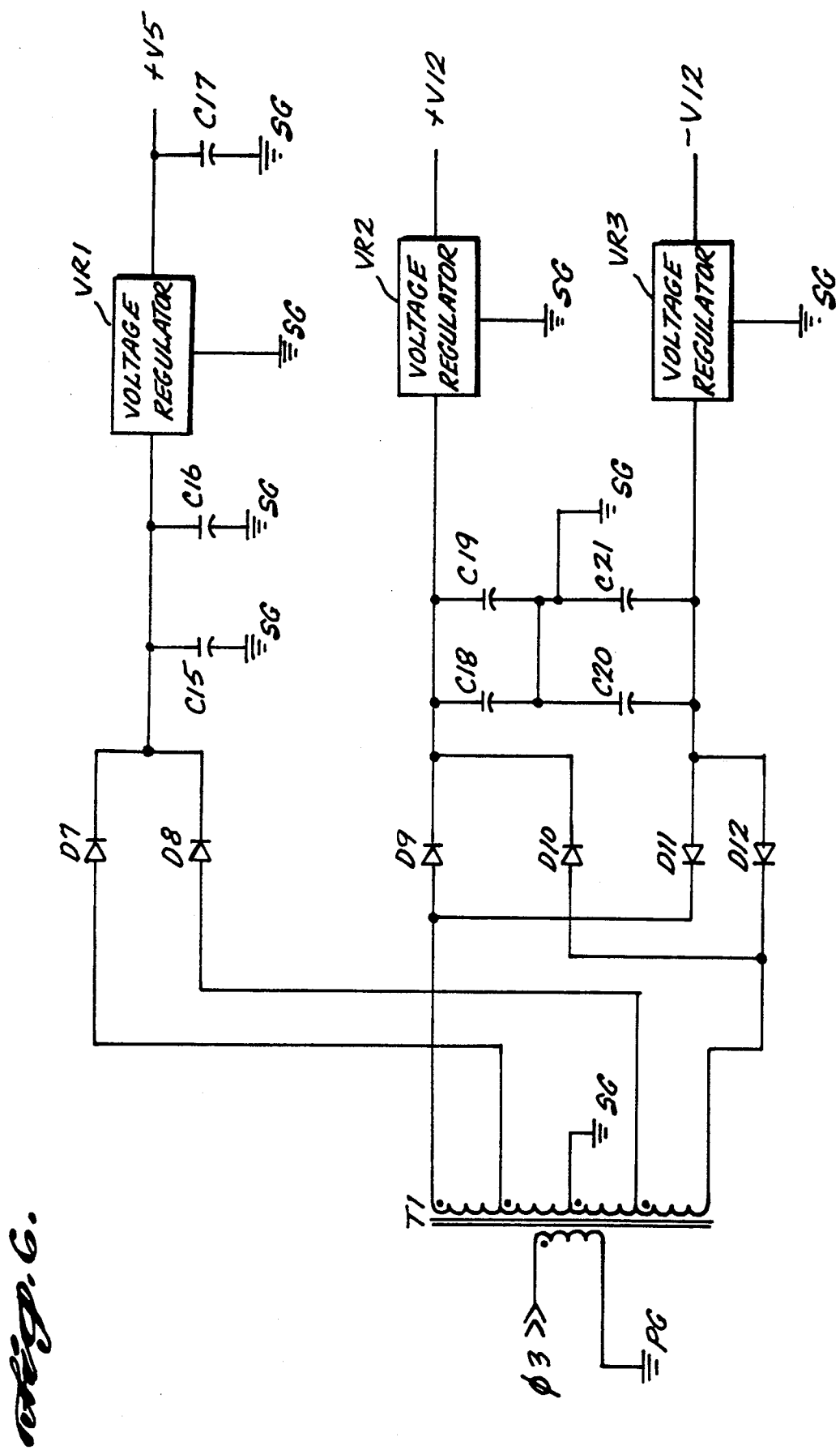
FIG. 6 is a schematic diagram of a low-power DC supply circuit suitable for use in the embodiment of the invention illustrated in FIG. 3.

$\phi 3$ voltage is also supplied to a low power DC supply circuit 45. The low power DC supply circuit 45, a preferred embodiment of which is illustrated in FIG. 6 and described below, produces low power DC voltages designated +V5, +V12, and −V12. +V5, +V12, and −V12 are supplied to the various other circuits illustrated in FIG. 3 in the manner described below.

Figure 7:
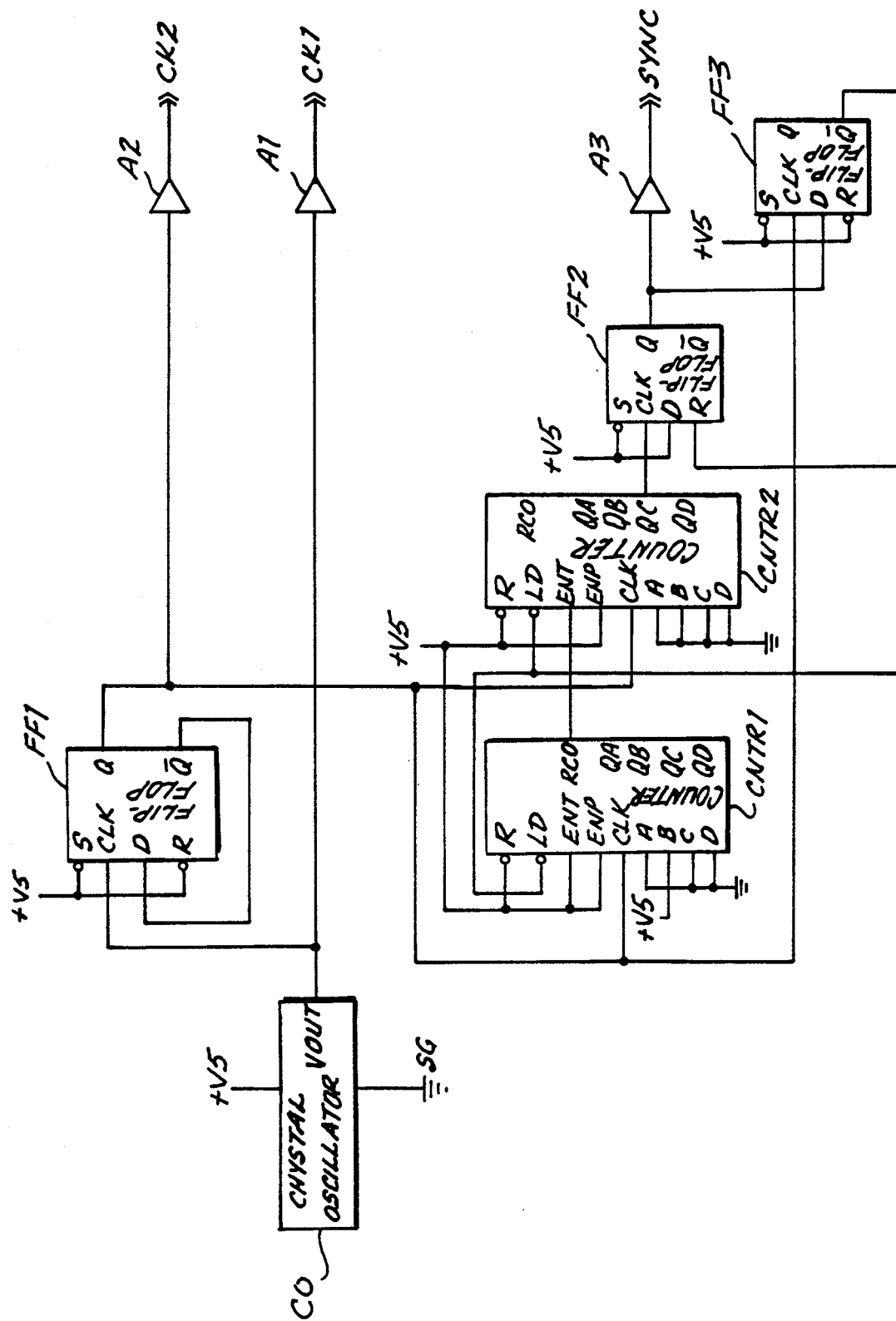
FIG. 7 is a schematic diagram of an oscillator circuit suitable for use in the embodiment of the invention illustrated in FIG. 3.

FIG. 3 also includes an oscillator 47. The oscillator produces sync pulses designated SYNC, at fixed intervals, plus two trains of clock pulses designated CK1 and CK2. FIG. 7 illustrates a preferred embodiment of an oscillator 47 suitable for use in the embodiment of the invention illustrated in FIG. 3. As described more fully in connection with FIG. 7, CK1 is, preferably, twice the frequency of CK2.

Figure 8:
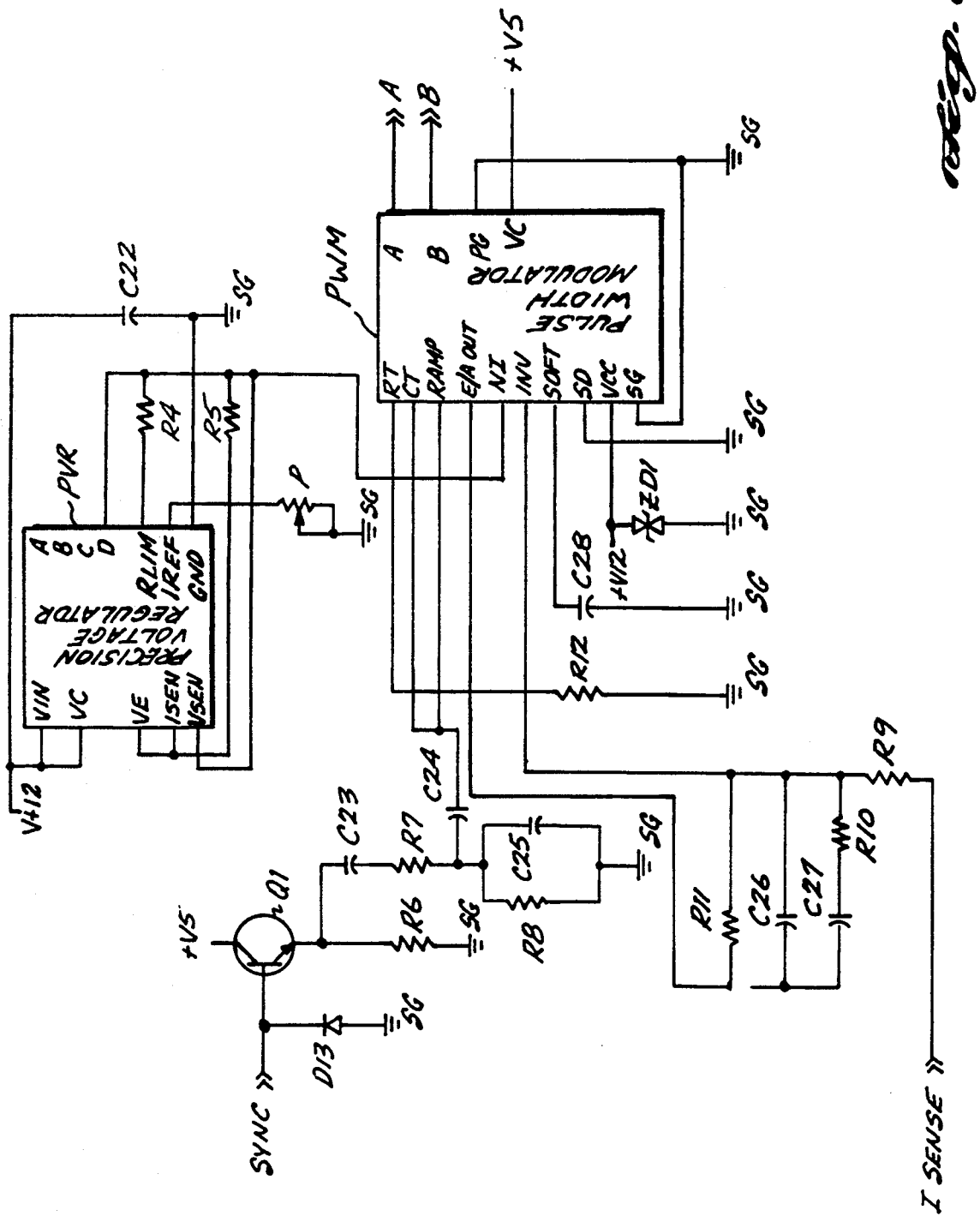
FIG. 8 is a schematic diagram of a pulse width modulator circuit suitable for use in the embodiment of the invention illustrated in FIG. 3.

The SYNC pulses produced by the oscillator 47 are applied to a pulse width modulator (PWM) circuit 49. A preferred embodiment of a PWM control circuit suitable for use in the embodiment of the invention illustrated in FIG. 3 is illustrated in FIG. 8 and described below. In addition to SYNC pulses, the PWM circuit receives an I SENSE signal produced by a current sense circuit 51 illustrated in FIG. 14 and also described below. As will be better understood from the following description of the PWM circuit illustrated in FIG. 8, the PWM circuit produces two pulse trains designated A and B. While the frequency of the A and B pulse trains are the same, they are alternatively produced. Specifically, they are out of phase by 180° and have a frequency equal to one-half the frequency of the SYNC pulses. The width of the A and B pulses is controlled by SYNC and I SENSE. The occurrence of a SYNC pulse starts either an A pulse or a B pulse and the magnitude of I SENSE controls the termination of the A or B pulse.

Figure 9:
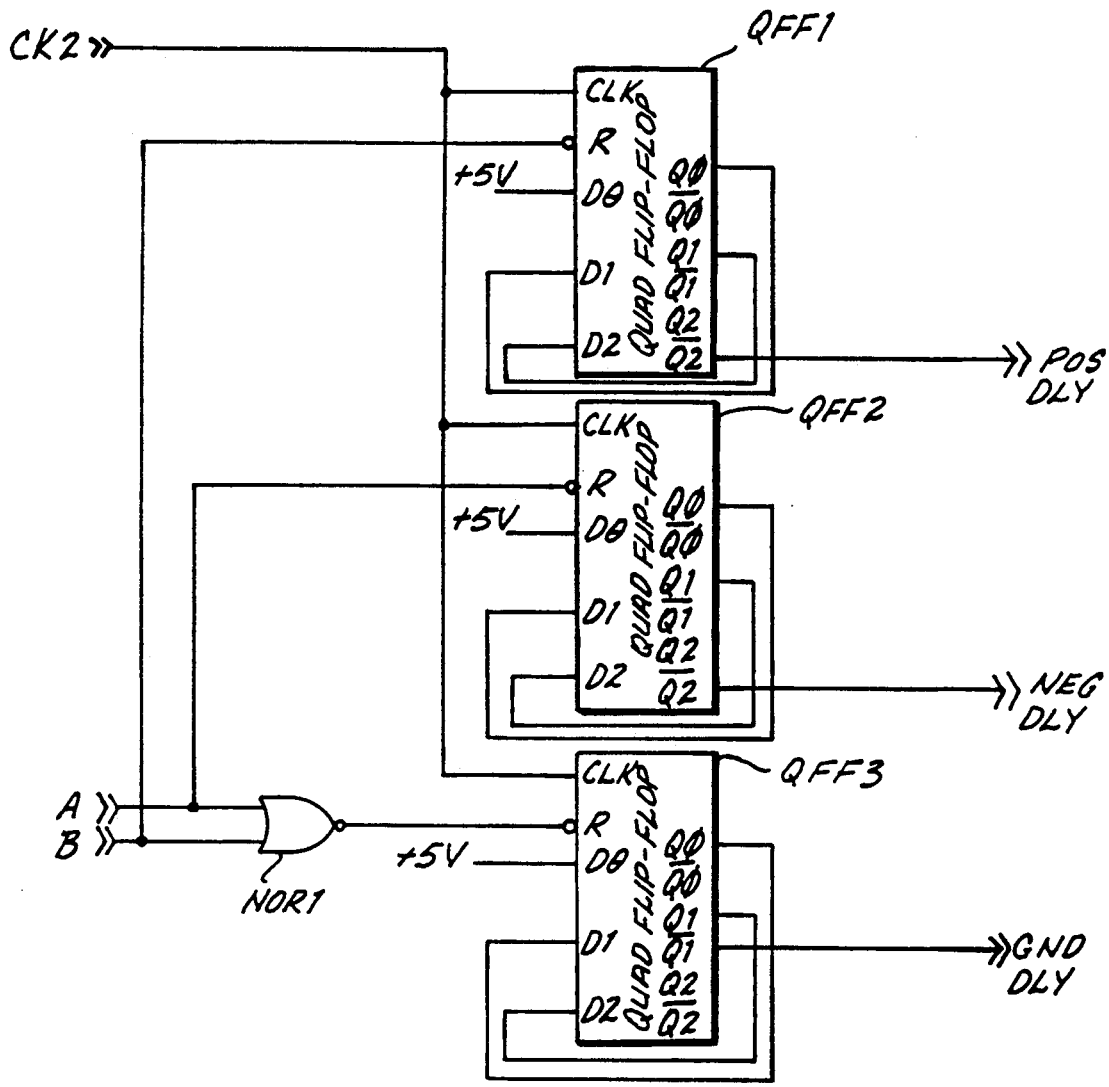
FIGS. 9, 10, and 11 combine to form a schematic diagram of a switch drive circuit suitable for use in the embodiment of the invention illustrated in FIG. 3.
Figure 10:
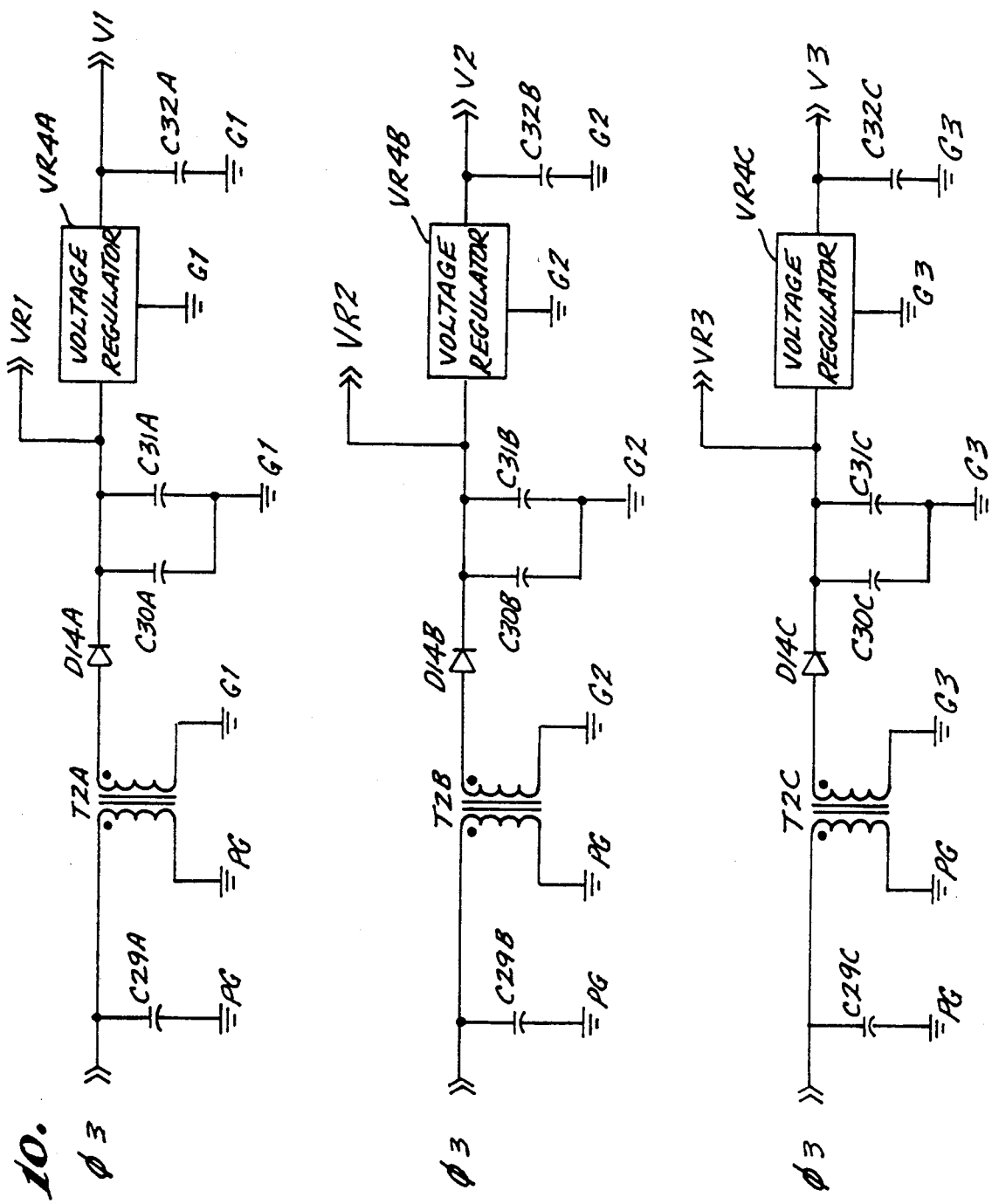
Figure 11:
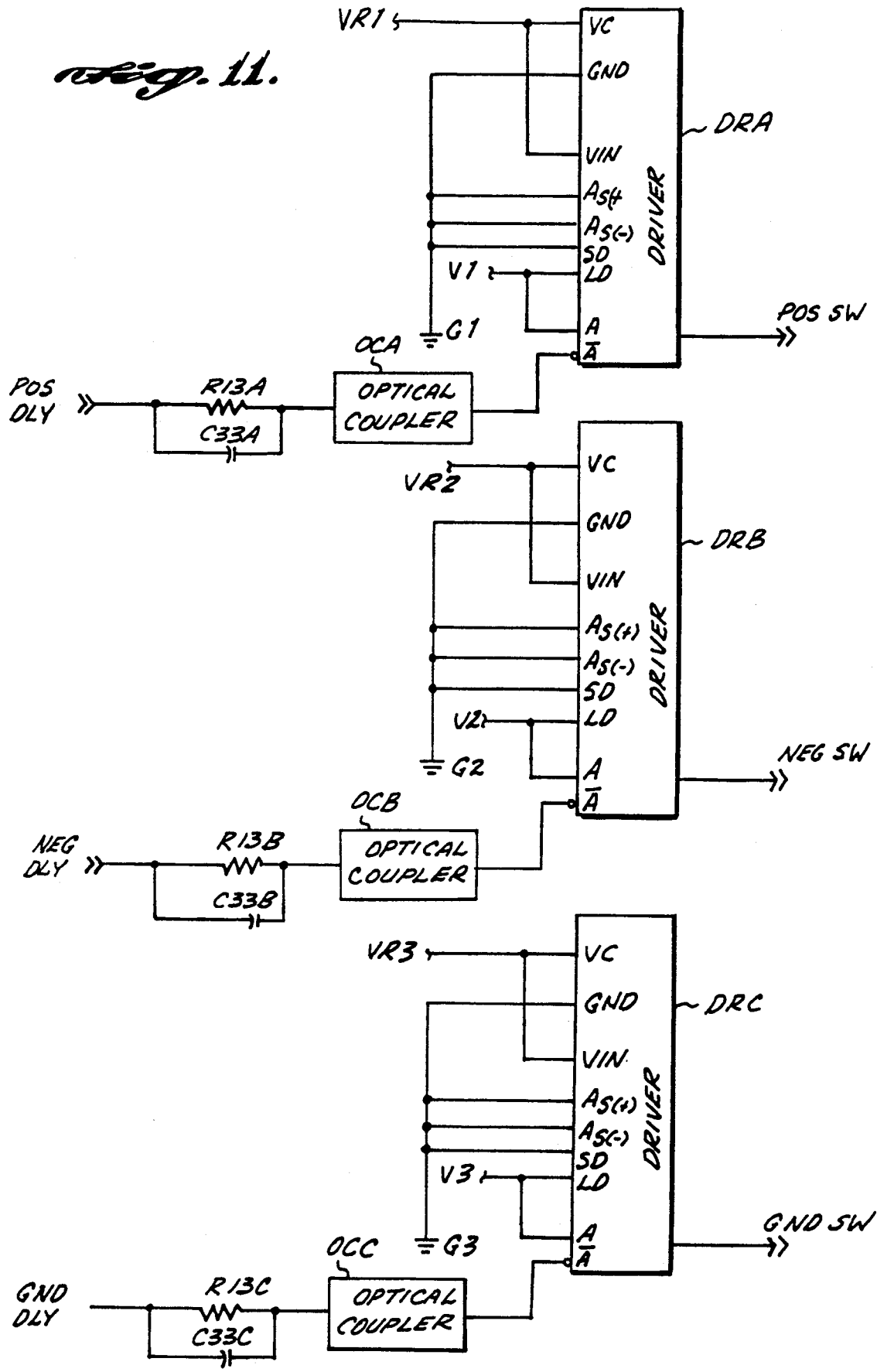

The A and B pulse trains are applied to a switch drive circuit 53, a preferred embodiment of which is illustrated in FIGS. 9, 10, and 11 and described below. In addition to the A and B pulse trains, the switch drive circuit 53 also receives the $\phi 3$ voltage produced by the EMI line filter circuit 41 and CK2 clock pulses. The switch drive pulses produce positive, negative, and ground switch control signals designated POS SW, NEG SW, and GND SW, respectively. POS SW, NEG SW, and GND SW are applied to the power switch circuit 55. The switch drive circuit 53 also produces three voltages isolated from power ground and signal ground designated VR1, VR2, and VR3, and their related grounds, which are not shown in FIG. 3. VR1, VR2, and VR3 are also applied to the power switch circuit 55.

As described more fully below in connection with the power switch circuit illustrated in FIG. 12, the power switch circuit 55 produces switched power designated PO SW, which is applied to an output filter circuit 57. As shown in FIG. 13 and described below, the output filter circuit 57 filters PO SW and generates two balanced outputs designated AUTOTUNE A and AUTOTUNE B that are applied via an autotune network 59 to the supply loop 31.

In addition to the current sense circuit 51 and the output filter circuit 57, FIG. 13 also illustrates a voltage sense circuit 61 suitable for use in the power supply illustrated in FIG. 3. The current sense circuit is coupled to the AUTOTUNE A and AUTOTUNE B outputs of the output filter 57 and senses the current applied to the supply loop 31. As described above, the current sense circuit 51 produces an I SENSE signal denoting the magnitude of the sensed current. The current sense circuit also produces a signal designated I PH SENSE that is in phase with the current component of the power applied to the supply loop. I PH SENSE is applied to the autotune circuit 59. The voltage sense circuit produces a signal, designated V PH SENSE, that is in phase with the voltage component of the power applied to the supply loop. V PH SENSE is also applied to the autotune circuit 59. The autotune circuit also receives CK1. The autotune circuit 59 produces a phase interrupt signal at selected times described below, designated $\overline{\text{PHASE INT}}$, that is applied to a control circuit 63. The autotune circuit 59 receives control signals from the control circuit designated $\overline{\text{BITE 1 SEL}}$, $\overline{\text{I LEAD SEL}}$, $\overline{\text{I LAG SEL}}$, $\overline{\text{RELAY A SEL}}$, $\overline{\text{RESET I LAGS SENSE}}$, $\overline{\text{RESET I LEADS SENSE}}$, and $\overline{\text{LEAD LAG SENSE}}$. Finally, an eight-bit data bus designated D0-D7 couples the autotune circuit 59 and the control circuit 63 together. In addition to receiving signals from the autotune circuit 59 and supplying instructions thereto, the control circuit 63 receives data from a temperature sensor circuit 65.

In operation, the rectified and filtered DC voltages (+VA and −VB) received by the power circuit 55 are switched by the power switch circuit to create a PO SW voltage of the type illustrated in FIG. 2. The switching by the power switch circuit 55 is controlled by the PWM circuit 49 via the switch drive circuit 53. More specifically, as described above, the SYNC pulses produced by the oscillator 47 control the leading edge of A and B pulses, which are alternately produced. The I SENSE voltage controls the trailing edge of the A and B pulses. The A and B pulses are combined and the combined pulses are delayed by one or two CK2 clock pulses with respect to the A and B pulses. The delayed pulses are used to control switch drivers that create the POS SW, NEG SW and GND SW control signals that control the power switch circuit 55 and, thus, the creation of the switched output voltage, i.e., PO SW.

The $\overline{\text{PHASE INT}}$ command produced by the autotune circuit 59 causes the control circuit 63 to read data on the data bus (D0-D7). The D0-D7 data is based on the phase relationship or angle between the I PH SENSE and the VPH SENSE signals. The control circuit 63 determines if the current component of the power applied to the supply loop is leading or lagging the voltage component and the magnitude of the lead or lag, i.e., the phase angle. Based on this information, the control circuit produces D0–D7 data signals and a RELAY A SEL control signal. The RELAY A SEL control signal causes the autotune circuit to read the D0–D7 data signals. The autotune circuit uses the D0–D7 data to control a series of relays that, in turn, control the magnitude of the capacitance connected in series with the supply loop. The capacitance magnitude is chosen to maintain the power supplied to the supply loop nearly resonant, i.e., maintain the phase angle between the voltage and current components of the supply loop power low.

Figure 4:
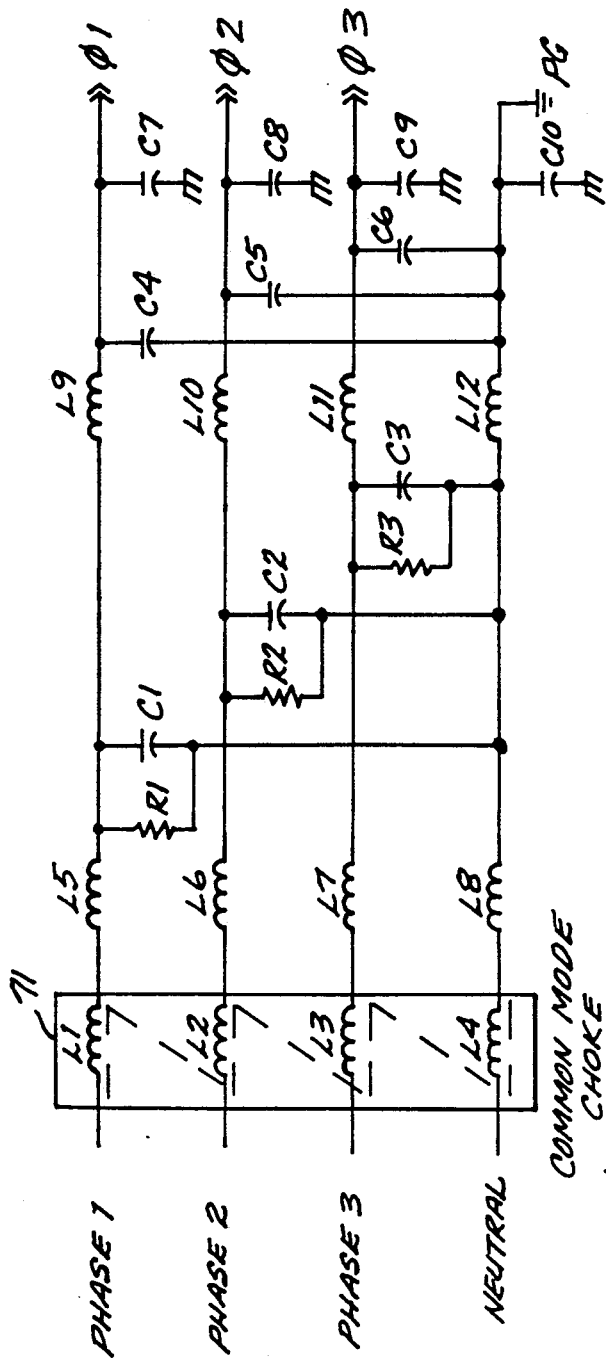
FIG. 4 is a schematic diagram of an EMI line filter circuit suitable for use in the embodiment of the invention illustrated in FIG. 3.

FIG. 4 is a schematic diagram of an EMI line filter circuit suitable for use in the embodiment of the invention illustrated in FIG. 3. The EMI line filter circuit illustrated in FIG. 4 comprises: a common mode choke 71 comprising four inductors designated L1, L2, L3, and L4 that are inductively coupled together; eight individual inductors designated L5–L12; three resistors designated R1, R2, and R3; and ten capacitors designated C1–C10. The phase 1 line from the three-phase line voltage source is connected through L1 to one end of L5; the phase 2 line is connected through L2 to one end of L6; the phase 3 line is connected through L3 to one end of L7; and the neutral line is connected through L4 to one end of L8. The other end of L5 is connected to one end of L9 and through R1 connected in parallel with C1 to the other end of L8. The other end of L6 is connected to one end of L10 and through R2 connected in parallel with C2 to the other end of L8. The other end of L7 is connected to one end of L11 and through R3 connected in parallel with C3 to the other end of L8. The other end of L8 is also connected to one end of L12. The other end of L9 is connected through C4 to the other end of L12 and through C7 to chassis ground. The other end of L10 is connected through C5 to the other end of L12 and through C8 to chassis ground. The other end of L11 is connected through C6 to the other end of L12 and through C9 to chassis ground. The other end of L12, which is power ground (PG), is also connected through C10 to chassis ground. $\phi1$ is formed at the junction of L9, C4, and C7; $\phi2$ is formed at the junction of L10, C5, and C8; and $\phi3$ is formed at the junction of L11, C6, and C9.

As will be readily appreciated by those skilled in the filtering art and others, the EMI line filter circuit illustrated in FIG. 4 is a three-phase filter that has high common rejection due to the inclusion of a common mode choke 71. The remaining elements form differential mode noise rejection filters. The EMI line filter circuit prevents switching noise created by the power switches of the power switch circuit 55 (FIG. 3) and the rectifiers of the rectifier and filter capacitor circuit 43 from contaminating power applied to other systems by the three-phase line voltage power source.

Figure 5:
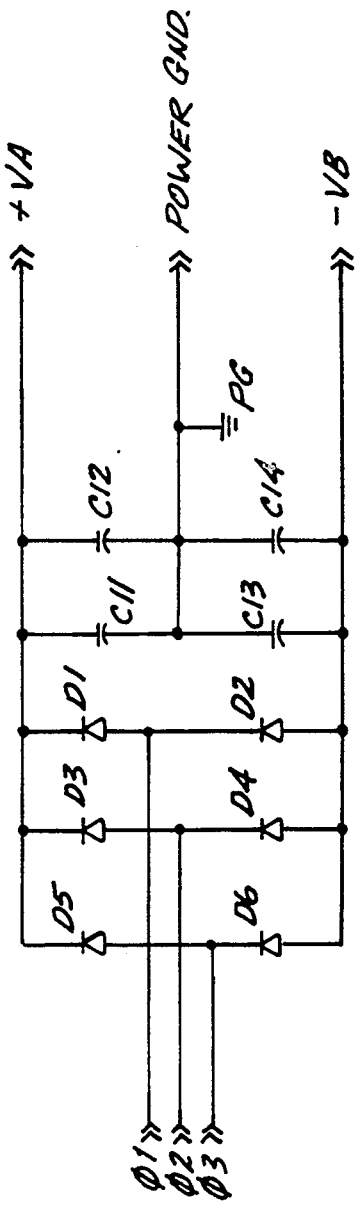
FIG. 5 is a schematic diagram of a rectifier and filter capacitor circuit suitable for use in the embodiment of the invention illustrated in FIG. 3.

FIG. 5 is a schematic diagram of a rectifier and filter capacitor circuit suitable for use in the embodiment of the invention illustrated in FIG. 3. The rectifier and filter capacitor circuit comprises: six diodes designated D1, D2, D3, D4, D5, and D6; and four capacitors designated C11, C12, C13, and C14. The $\phi1$ output of the EMI line circuit (FIG. 4) is connected to the anode of D1 and the cathode of D2; the $\phi2$ output is connected to the anode of D3 and the cathode of D4; and the $\phi3$ output is connected to the anode of D5 and the cathode of D6. The cathodes of D1, D3, and D5 are connected together. The voltage at the cathodes of D1, D3, and D5 is the +VA voltage applied to the power switch circuit 55 (FIG. 3). The anodes of D2, D4, and D6 are connected together. The voltage at the anodes of D2, D4, and D6 is the −VB voltage applied to the power switch circuit 55. C11 and C12 are connected between the cathodes of D1, D3, and D5 and power ground (PG). C13 and C14 are connected between the anodes of D2, D4, and D6 and power ground. As will be readily appreciated by those skilled in the art and others, the diodes of the rectifier and filter capacitor circuit rectify the three-phase line voltage produced at the output of EMI line filter circuit into positive (+VA) and negative (−VB) pulsating DC voltages. The capacitors filter the pulsating DC voltages.

FIG. 6 is a schematic diagram of a low power DC supply circuit suitable for use in the embodiment of the invention illustrated in FIG. 3. The low power DC supply circuit illustrated in FIG. 6 comprises a transformer designated T1; six diodes designated D7–D12; seven capacitors designated C15–C21; and three voltage regulators designated VR1, VR2, and VR3. T1 includes a primary winding and a center tapped secondary winding. In addition to the center tap, the secondary winding includes intermediate taps located between the center tap and the ends of the winding. In a conventional manner the T1 windings include dots to indicate the phase relationship of the windings. The $\phi3$ output of the EMI line filter circuit (FIG. 4) is connected to the dot end of the primary winding of T1. The nondot end of the primary winding of T1 is connected to power ground (PG). The center tap of the secondary winding of T1 is connected to signal ground (SG). The dot end of the secondary winding of T1 is connected to the anode of D9 and to the cathode of D11. The nondot end of the secondary winding of T1 is connected to the anode of D10 and to the cathode of D12. The intermediate tap located between the center tap and the dot end of the secondary winding of T1 is connected to the anode of D7. The intermediate tap located between the center tap and the nondot end of the secondary winding of T1 is connected to the anode of D8. The cathodes of D7 and D8 are connected together and through C15 connected in parallel with C16 to SG. The cathodes of D7 and D8 are also connected to the input of VR1. The output of VR1 is connected through C17 to SG. The output of VR1 is the low power DC voltage previously designated +V5. The cathodes of D9 and D10 are connected together and through C18 connected in parallel with C19 to SG. The cathodes of D9 and D10 are also connected to the input of VR2. The output of VR2 is the low power DC voltage previously designated +V12. The anodes of D11 and D12 are connected together and through C20 connected in parallel with C21 to SG. The anodes of D11 and D12 are also connected to the input of VR3. The output of VR3 is the low power DC voltage previously designated −V12. As will be readily appreciated by those familiar with DC power supplies, the diode pairs, i.e., D7 and D8, D9 and D10, and D11 and D12, rectify the AC voltage developed across the secondary winding of T1. The capacitors filter the rectified voltage and the voltage regulators regulate the filtered voltage.

FIG. 7 is a schematic diagram of an oscillator circuit suitable for use in the embodiment of the invention illustrated in FIG. 3. The oscillator circuit illustrated in FIG. 7 comprises: a crystal oscillator designated CO; three D flip-flops designated FF1, FF2, and FF3; two counters designated CNTR1 and CNTR2; and three buffers designated A1, A2, and A3. Because CO, FF1–FF3, and A1–A3 are conventional, well-known items of the designated type, they are not described in detail here. While counters are also well-known devices, because a wide variety are available, the terminals of the specific type used in one actual embodiment are shown in FIG. 7 based on the belief that this will aid in the understanding of the invention. It is to be understood, of course, that the invention is not to be construed as limited to such counters and that other types of counters can be used. The counter chosen for the actual embodiment of the invention whose input and output terminals are shown in FIG. 7 was the fully synchronous SN74LS163A counter produced by Texas Instruments, Inc., Dallas Texas. This counter includes four data inputs designated A, B, C, and D; four data outputs designated QA, QB, QC, and QD; a reset input designated R, a load control input designated LD; two enable inputs designated ENT and ENP; a clock input designated CLK; and a ripple carry output designated RCO.

CO receives the +V5 low power DC voltage produced by the low power DC supply (FIG. 6) in the manner described above. CO is also connected to signal ground (SG). The output of CO is applied to the clock (CLK) input of FF1 and to the input of A1. The output of the A1 is the CK1 clock pulse train illustrated in FIG. 3 and previously described. The set (S) and reset (R) inputs FF1 are connected to +V5. The $\overline{Q}$ output of the FF1 is connected to the D input of FF1. The Q output of FF1 is connected to the input of A2 and to the clock (CLK) inputs of CNTR1, CNTR2, and FF3. The output of A2 is the CK2 clock pulse train illustrated in FIG. 3 and described above. As will be readily appreciated by those skilled in the art and the others from viewing FIG. 6 and the previous description, FF1 forms a divide-by-two counter. As a result, the CK2 pulse frequency rate is one-half the CK1 pulse frequency rate.

The R, ENT, and ENP inputs of CNTR1 are connected to +V5. The B input of CNTR1 is connected to +V5 and the A, C, and D inputs are connected to SG. The QA, QB, QC, and QD outputs of CNTR are unconnected. The RCO output of CNTR1 is connected to the ENT input of CNTR2. The R and ENP inputs of CNTR2 are connected to +V5. The A, B, C, and D inputs of CNTR2 are connected to SG. The RCO, QA, QB, and QD outputs of CNTR2 are unconnected. The QC output of CNTR2 is connected to the clock (CLK) input of FF2. The S and D inputs of FF2 are connected to +V5. The Q output of FF2 is connected to the input of A3 and to the D input of FF3. The S and R inputs of FF3 are connected to +V5. The $\overline{Q}$ output of FF3 is connected to the R input of FF2 and the LD inputs of CNTR1 and CNTR2. SYNC pulses are produced at the output of A3.

As will be appreciated by those skilled in the art and others from viewing FIG. 6 and the previous description, CNTR1, CNTR2, and FF2 form a counter that is preset to a predetermined value. The next CK2 pulse after a SYNC pulse begins causes the preset value to be loaded into CNTR1 and CNTR2. The preset value is determined by the binary state of the A, B, C, and D inputs of CNTR1 and CNTR2. The binary state is, of course, determined by which of the A, B, C, and D inputs are connected to +V5 and which are connected to SG. More specifically, the CK clock pulse occurring after a SYNC pulse begins, i.e., the Q output of FF2 shifts high, causes the $\overline{Q}$ output of FF3 to shift low. This action resets FF2 (thereby ending the SYNC pulse) and loads CNTR1 and CNTR2 with the A, B, C, and D preset binary values. Subsequent CK2 clock pulses increment the CNTR1 until its RCO output shifts high to enable CNTR2 to count a CK2 pulse. Thereafter, CNTR1 counts CK2 clock pulses until its RCO output again shifts high to enable CNTR2 to count another CK2 pulse. The sequence continues until the QC output of CNTR2 shifts from a low state to a high state. When this occurs, FF2 is clocked, causing the Q output of FF2 to shift from a low state to a high state and the entire cycle to be repeated.

FIG. 8 is a schematic diagram of a pulse width modulator circuit suitable for use in the embodiment of the invention illustrated in FIG. 3. The pulse width modulator circuit illustrated in FIG. 3 comprises: a precision voltage regulator designated PVR; a pulse width modulator designated PWM; an NPN transistor designated Q1; a diode designated D13; nine resistors designated R4-R12; seven capacitors designated C22-C28; and a bidirectional zener diode designated ZD1.

While various precision voltage regulators can be utilized, in one actual embodiment of the invention, the precision voltage regulator chosen was an LH0075 positive precision programmable regulator produced by National Semiconductor Corporation. As shown in FIG. 8, the LH0075 includes a plurality of input and output terminals designated VIN, VC, VE, I SEN, V SEN, A, B, C, D, RLIM, IREF, and GND, all shown in the LH0075 applications notes. As used in an actual embodiment of the present invention, VIN and VC were connected to the +V12 output of the low power DC supply (FIG. 6). GND was connected to signal ground (SG) and through C22 to +V12. The A, B, and C terminal of PVR were unconnected. A precisely regulated output voltage produced at terminal D was connected to PWM in the manner hereinafter described. Terminal D was also connected to V SEN, through R4 to RLIM and through R5 to VE and I SEN. IREF was connected through a potentiometer, designated P to SG.

While various types of pulse width modulators can be utilized to carry out the functions of PWM, in one actual embodiment of the invention, the chosen PWM was a UC1825 high-speed PWM controller produced by Unitrode Integrated Circuits, Merrimack, N.H. This PWM alternately produces one or the other of two pulse width modulated output pulses designated A and B. More specifically, the UC1825 includes a plurality of input and output terminals designated RT, CT, RAMP, E/A OUT, NI, INV, SOFT, SD, VCC, SG, A, B, PG, and VC. As described in the UC1825 applications notes, RT and CT are, respectively, resistor and capacitor control inputs that control the frequency of the pulses produced by an oscillator that forms part of the UC1825. The RAMP input controls the generation of a ramp that is compared (internally) with the difference between signals applied to the NI and INV inputs. E/A is an output whose magnitude is proportional to the difference between the NI and INV inputs. The voltage applied to the SOFT terminal controls soft starting. Shutdown of the pulse width modulator is controlled by the signal applied to the SD input. Power is applied to the VCC and VC inputs of the UC1825. SG is a signal ground terminal. Finally, the A and B pulse trains produced by the pulse width modulator occur on the A and B outputs.

The SYNC signal produced by the oscillator circuit 47 is applied to the base of Q1 and to the cathode of D3.

The anode of D3 is connected to SG. The collector of Q1 is connected to +V5. The emitter of Q1 is connected through R6 to SG. The emitter of Q1 is also connected through C23 connected in series with R7 and C24 to the CT and RAMP terminals of PWM. The junction between R7 and C24 is connected through R8 connected in parallel with C25 to SG. The RT terminal of PWM is connected through R12 to ground. The E/A OUT terminal of PWM is connected through R11 to the INV terminal of PWM. C26 is connected in parallel with R11. C27 and R10 are connected in series and the series circuit is connected in parallel with R11 and C26. The I SENSE signal produced by the current sense circuit 51 illustrated in FIG. 13 and described below is applied through R9 to the INV input of PWM. The SOFT terminal of PWM is connected through C28 to SG. The SD terminal of PWM is connected to SG. The VCC terminal of PWM is connected to +V12 and through ZD1 to SG. The signal ground (SG) and power ground (PG) terminals of PWM are connected to SG. The VC terminal is connected to +V5.

Pulse width control is centered around PWM. The SYNC signal produced by the oscillator is level-shifted by Q1 and its associated resistive and capacitive components and the result used to synchronize the pulses formed on PWM outputs A and B to the system clock. This allows very close regulation of power output frequency. The magnitude of I SENSE controls the width of the pulses formed on PWM outputs A and B. In this regard, the chosen PWM is designed to alternately produce pulses on the A and B outputs. R9, R10, R11, C26, and C27 along with an error amplifier that is internal to PWM provide a dominant pole at low frequency. This provides stability and a positive phase shift near the loop gain zero db crossover frequency, which improves transient response. PVR and its associated resistive and capacitive components provide a stable reference for setting the output current amplitude. The PVR circuit can be simplified if adjustment to the output current is not required. PWM start-up is slow and controlled by the value of C28, which, as noted above, is connected to the soft start input of PWM.

FIGS. 9, 10, and 11 illustrate a switch drive circuit suitable for use in the embodiment of the invention illustrated in FIG. 3. As will be better understood from the following description, FIG. 9 illustrates a delay circuit that produces delayed control pulses vis-a-vis the A and B pulses produced by the PWM. FIG. 10 illustrates a power supply that is independent of the system power supply, i.e., a floating power supply, and FIG. 11 illustrates a driver circuit that produces the switching pulses that control the power switch circuit 55 (FIG. 12).

The delay circuit illustrated in FIG. 9 comprises a two-input positive NOR gate designated NOR1; and three quad D-type flip-flops, i.e., three four-stage D-type flip-flops, designated QFF1, QFF2, and QFF3. While various types of quad D-type flip-flops can be used, one suitable type is the MM54HC175/MM74HC175 quad D-type flip-flop with clear produced by National Semiconductor. This quad D-type flip-flop includes a clear or reset (R) input that clears all of the stages, i.e., resets them to zero, when enabled. A clock (CLK) input clocks the signals at the D inputs of the four stages to the Q/$\overline{Q}$ outputs. More specifically, each stage includes a D input designated D0, D1, D2, or D3, and associated Q and $\overline{Q}$ outputs designated Q0/$\overline{Q0}$, Q1/$\overline{Q1}$, Q2/$\overline{Q2}$, and Q3/$\overline{Q3}$, respectively. (The D3 input and the Q3/$\overline{Q3}$ outputs are not shown in FIG. 9 because they are not used.)

CK2 is applied to the clock (CLK) inputs of QFF1, QFF2, and QFF3. The A output of PWM is applied to one input of NOR1 and to the reset (R) input of QFF2. The B output of PWM is applied to the second input of NOR1 and to the reset (R) input of QFF1. The output of NOR1 is applied to the reset (R) input of FF3. The D0 inputs of QFF1 through QFF3 are all connected to +5 V. The Q0 output of QFF1 is applied to the D1 input of QFF1, and the Q1 output of QFF1 is applied to the D2 input of QFF1. Similarly, the D0 output of QFF2 is applied to the D1 input of QFF2, and the Q1 output of QFF2 is applied to the D2 input of QFF2. Further, the Q0 output of QFF3 is applied to the D1 input of QFF3, and the Q1 output of QFF3 is applied to the D2 input of QFF3. The D2 output of QFF1 forms a signal designated POS DLY, the Q2 output of QFF2 forms a signal designated NEG DLY, and the Q2 output of QFF3 forms a signal designated GND DLY.

As will be understood from the previous description, pulses do not simultaneously exist on lines A and B. While no pulse may exist on either line, if a pulse is present on one line, it is not present on the other line. The trailing edge of an A or B pulse resets the related quad flip-flop QFF1 or QFF2. When this occurs, the noninverted outputs (Q0, Q1, and Q2) of both flip-flops shift to a low state. As a result, the only D input of the reset quad flip-flops that is high is the D0 input. As long as the related A or B input remains low, the related quad flip-flop, QFF1 or QFF2, remains in a reset state. The next clock pulse that occurs after an A or B pulse starts, i.e., the A or B input shifts high, causes the Q0 output of the related quad flip-flop to shift high, whereby a high input is applied to the D1 input of that quad flip-flop. The following clock pulse causes the Q1 output of the enabled quad flip-flop to shift from a low state to a high state, placing a high on the D2 input of the quad flip-flop. The next clock pulse causes the Q2 output to shift high, creating the beginning of a POS DLY or NEG DLY pulse, depending upon whether an A or a B pulse is occurring. When the trailing edge of the A or B pulse occurs, the related quad flip-flop QFF1 or QFF2 is reset and remains reset as described above. As a result, the leading edge of POS DLY and NEG DLY pulses are delayed by two clock pulses with respect to the leading edge of the related A or B pulse. QFF3 functions in a similar manner to produce delayed ground pulses, i.e., GND DLY pulses. In this case, the output of NOR1 shifts from a low state to a high state when neither an A pulse nor a B pulse is present. The trailing edge of a pulse on the output of NOR1 resets QFF3. Clock pulses occurring after the leading edge of NOR1 output pulses shift the binary high created by the +5V voltage applied to the D0 input of QFF3 through two other stages of QFF3 until the Q2 output of QFF3 shifts from a low state to a high state to begin the production of a GND DLY pulse.

The floating power supply (FIG. 10) is a three-stage power supply. Each stage includes: a transformer designated T2A, T2B, and T2C; a diode designated D14A, D14B, and D14C; four capacitors designated C29A, C29B and C29C, C30A, C30B and C30C, C31A, C31B and C31C, C32A, C32B and C32C; and a voltage regulator designated VR4A, VR4B, and VR4C. All stages receive the $\phi$3 voltage produced by the EMI line filter circuit 41 illustrated in FIG. 4 and described above. Since each of these stages are identical, only the first or upper stage shown in FIG. 10 is described here. φ3 is applied to the dot terminal of the primary winding of T2A. The nondot terminal of the primary winding of T2A is connected to power ground (PG). C29A is connected in parallel with the primary winding of T2A. The dot terminal of the secondary winding of T2A is connected to the anode of D14A. The nondot terminal of T2 forms a floating ground designated G1 (or G2 or G3 in the case of the other stages). The cathode of D14A is connected through C30A connected in parallel with C31A to G1. The voltage at the cathode of D14 is an unregulated voltage designated VR1 (or VR2 or VR3 in the case of the other stages). VR1, in addition to being applied to other circuits as hereinafter described, is also applied to the input of VR4A. The output of VR4A is connected through C32 to G1. The output of VR4 is a regulated voltage designated V1 (or V2 or V3 in the case of the other stages of the floating power supply). In essence, T2A isolates the ground of the floating power supply from power ground or signal ground. D14A rectifies the floating power. The remaining circuit components filter and regulate the half wave rectified pulsating DC voltage formed at the cathode of D14A.

FIG. 11 illustrates a driver circuit. The driver circuit receives the POS DLY, NEG DLY, and GND DLY pulses, the floating voltages VR1, V1, VR2, V2, VR3, V3, and the floating grounds G1, G2 and G3, and produces the POS SW, NEG SW and GND SW pulses that operate the power switch circuit 55 illustrated in FIG. 12 and described below. More specifically, the driver circuit illustrated in FIG. 11 comprises three identical channels, each of which includes: a resistor designated R13A, R13B and R13C; a capacitor designated as C33A, C33B, and C33C; an optical coupler designated OCA, OCB, and OCC; and a driver circuit designated DRA, DRB, and DRC. While various driver circuits could be utilized, in one actual embodiment of the invention, the chosen driver was a UC1707 dual-channel powered driver linear integrated circuit produced by Unitrode Integrated Circuits, Merrimack, N.H. For ease of illustration and understanding, only some of the connection of a UC1707 are illustrated in FIG. 11. Other connections are simplified. For example, only one channel of the UC1707 is illustrated. However, since the UC1707 is a dual-channel power driver, it has two channels, which can be connected in parallel, if desired. The illustrated and unillustrated terminals of the UC1707 are, of course, described in the UC1707 applications notes.

The POS DLY signal produced by the delay circuit (FIG. 9) is applied through a parallel circuit formed by R13A and C33A to the input of OCA. The output of OCA is connected to the inverted input ($\overline{A}$) of the illustrated channel of DRA. VR1 is applied to the VC and VIN inputs of DRA. The ground terminal of DRA is connected to G1. The positive and negative analog stop terminals, AS(+) and AS(−), of DRA are also connected to G1 as is the shutdown (SD) terminal. V1 is applied to the latch disable (LD) and A terminals of DRA. The output of DRA is the POS SW control signal applied to the power switch circuit 55 illustrated in FIG. 12 and described below.

The other two channels of the driver circuit illustrated in FIG. 11 are identically connected. More specifically, NEG DYL is applied through R13B in parallel with C33B to the input of OCB. The output of OCB is connected to the inverted input ($\overline{A}$) of the illustrated channel of DRB. The VC and VIN terminals of DRB are connected to VR2; the GND, AS(+), AS(−), and SD terminals are connected to G2; and the LD and A terminals are connected to V2. The output of DRB is the NEG SW signal applied to the power switch circuit 55 illustrated in FIG. 12 and described below. GND DLY is applied through R13C in parallel with C33C to the input of OCC. The output of OCC is connected to the inverted input ($\overline{A}$) of the illustrated channel of DRC. The VC and VIN terminals of DRC are connected to VR3; the GND, AS(+), AS(−), and SD terminals are connected to G3; and the LD and A terminals are connected to V3. The output of DRC is the GND SW signal applied to the power switch circuit 55 in the manner described below.

As will be readily appreciated from the foregoing description and viewing FIGS. 9, 10, and 11, OCA, OCB, and OCC and DRA, DRB, and DRC provide isolated drive signals that have a very fast switching speed. T2A, T2B, and T2C, C29A through C32C, and VR4A through VR4C provide a local, regulated, floating power supply for DRA, DRB, and DRC.

Figure 12:
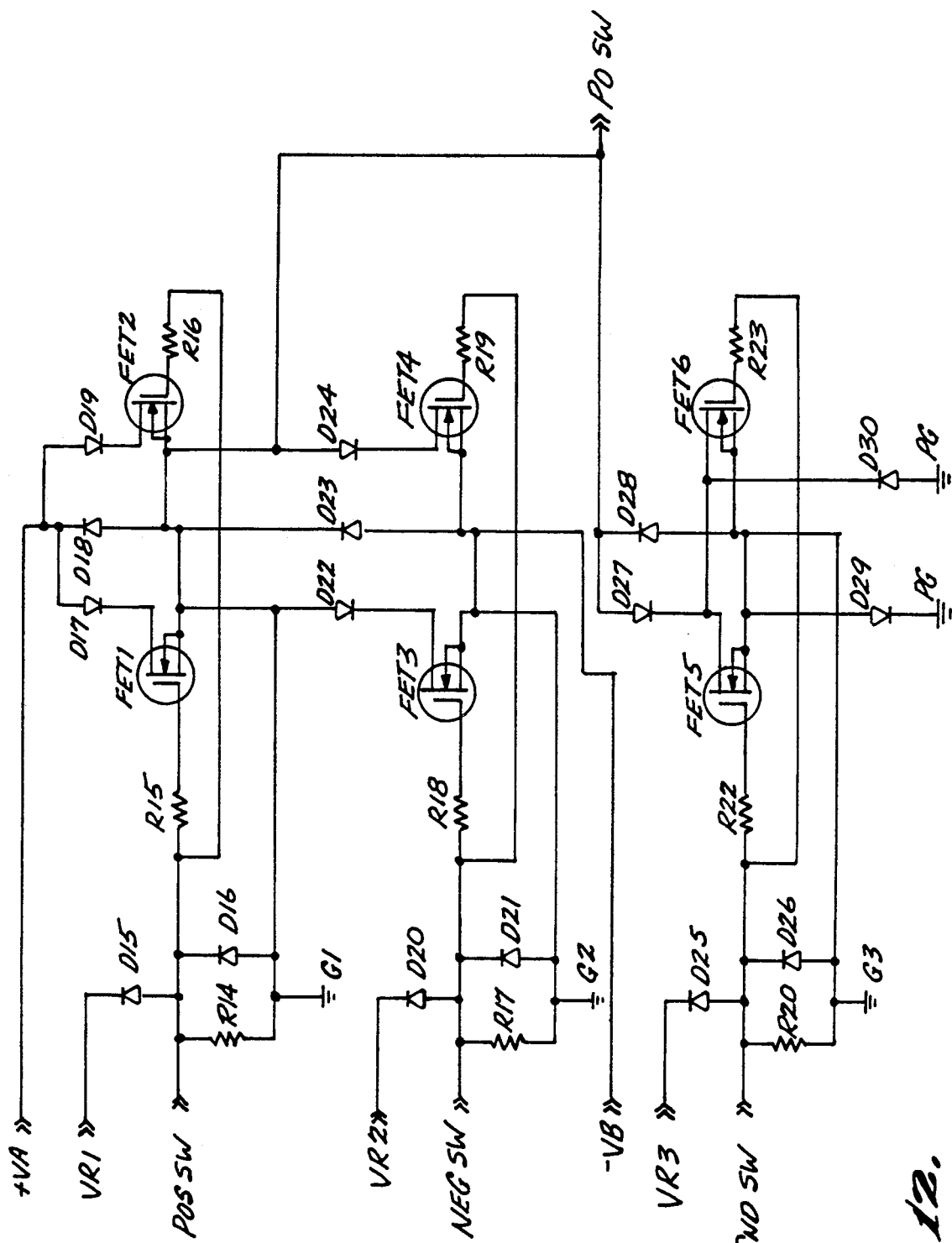
FIG. 12 is a schematic diagram of a power switch circuit suitable for use in the embodiment of the invention illustrated in FIG. 3.
Figure 13:
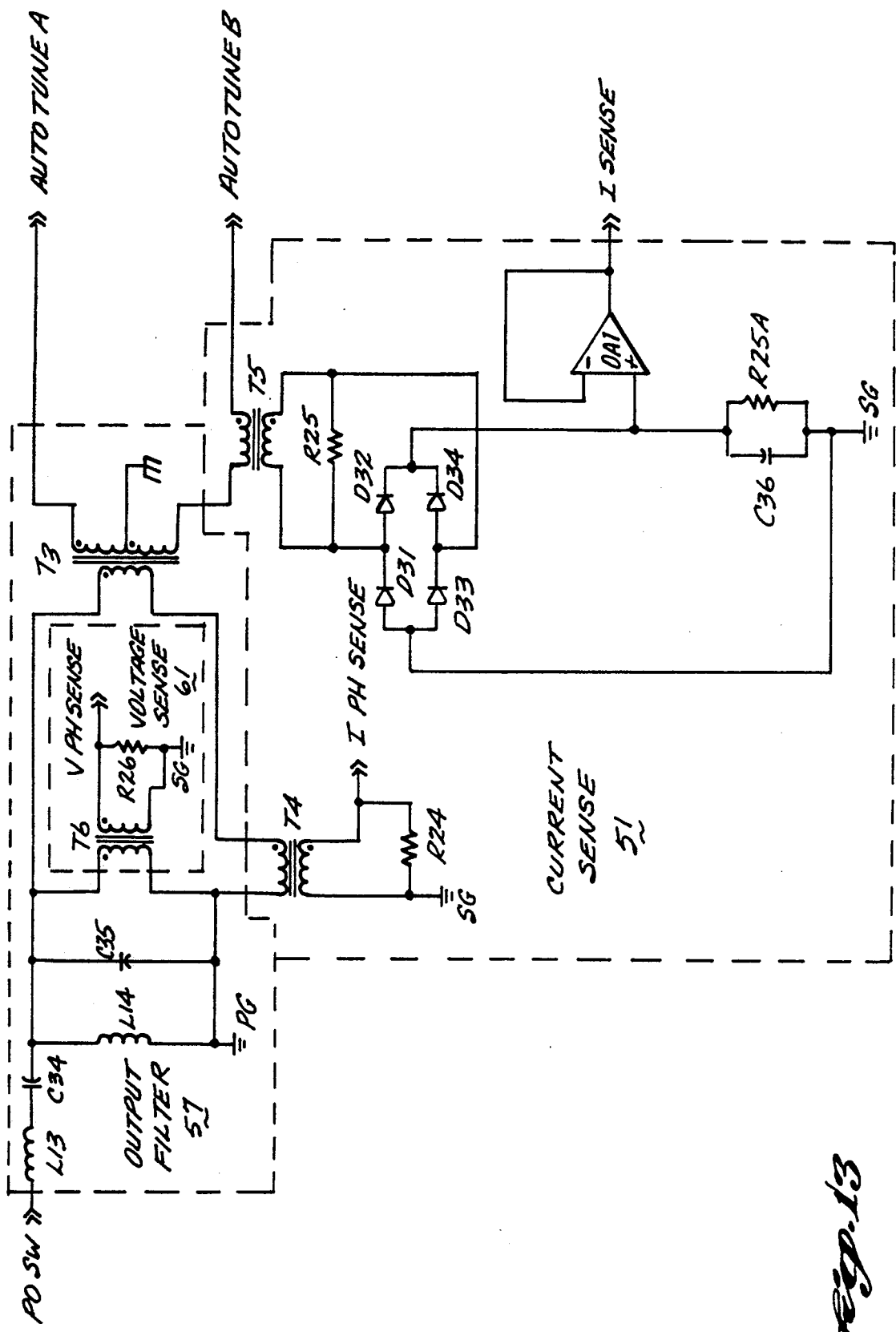
FIG. 13 is a schematic diagram of output filter, current sense and voltage sense circuits suitable for use in the embodiment of the invention illustrated in FIG. 3.

FIG. 12 is a schematic diagram of a power switch circuit suitable for use in the embodiment of the invention illustrated in FIG. 3. The power switch circuit illustrated in FIG. 12 comprises: sixteen diodes designated D15 through D30; nine resistors designated R14 through R23; and six field-effect transistor power switches designated FET1 through FET6. FET1 through FET6 are power MOS FETs. POS SW is applied through R15 to the gate of FET1 and through R16 to the gate of FET2. POS SW is also applied to the anode of D15, the cathode of D16 and through R14 to G1. The cathode of D15 is connected to VR1 and the anode of D16 is connected to G1. +VA is connected to the anode of D17, the anode of D19, and the cathode of D18. The cathode of D17 is connected to the drain terminal of FET1, and the cathode of D19 is connected to the drain terminal of FET2. The source terminals of FET1 and FET2 are connected to the anode of D18 and to G1.

NEG SW is applied through R18 to the gate of FET3 and through R19 to the gate of FET4. NEG SW is also applied to the anode of D20, the cathode of D21 and through R17 to G2. The cathode of D20 is connected to VR2 and the anode of D21 is connected to G2. −VB is connected to the source terminals of FET3 and FET4 and to the anode of D23. The cathode of D22 is connected to the drain terminal of FET3 and the cathode of D24 is connected to the drain terminal of FET4. The anodes of D22 and D24 and the cathode of D23 are connected to G1.

GND SW is applied through R22 to the gate of FET5 and through R23 to the gate of FET6. GND SW is also applied to the anode of D25, the cathode of D26 and through R20 to G3. The cathode of D25 is connected to VR3. The anode of D26 is connected to G3. The source terminal of FET5 is connected to the anode of D29 and the cathode of D29 is connected to power ground (PG). The drain terminal of FET6 is connected to the cathode of D30 and the anode of D30 is connected to PG. The source terminal of FET6 is connected to G3. The anode of D28 is connected to G3 and the cathode of D27 is connected to the drain terminal of FET5. The anode of D27 and the cathode of D28 are connected together and to the source terminals of FET1 and FET2. PO SW is formed at this junction.

In essence, the power switch circuit comprises three-switch circuits that create a "quasi-square wave" by creating low impedance paths for +VA, −VB, and power ground at appropriate times. The use of power MOS FETs provides fast switching, which reduces switching power losses, and allows low duty cycles for enhanced light load regulation.

The power switch delay circuit (FIG. 9) prevents cross-conduction between plus, minus, and ground switches. As noted above, after one of the outputs of PWM goes high, a delay of two (2) clock cycles is inserted before a switch is driven on. When switching off, no clock cycles are inserted, only the delays provided by the various ICs occur. The "plus" and "minus" switches have similar topology. D17 and D19 and D22 and D24 prevent reverse current flow in FET1, FET2, FET3, and FET4. This keeps the switching losses lower than if the MOS FET substrate diodes were allowed to conduct. D18 and D23 allow reverse current to flow through the "plus" and "minus" switches that normally would be blocked by D17, D19, D22, and D24. The ground switch circuit formed by D27 through D30 and FET5 and FET6 provides bidirectional current flow or blocks voltage of either polarity. D27–D30 switch at near zero amps, resulting in very low power loss due to diode switching.

FIG. 13 is a schematic diagram illustrating output filter, current sense and voltage sense circuits suitable for use in the embodiment of the invention illustrated in FIG. 3. The output filter circuit 57 illustrated in FIG. 13 comprises: two inductors designated L13 and L14; two capacitors designated C34 and C35; and a transformer designated T3. Switched power, i.e., PO SW, is applied through L13 connected in series with C34 to the dot side of the primary winding of T3. The nondot side of the primary winding of T3 is connected to power ground (PG) via the primary winding of a first transformer (T4) that forms part of the hereinafter described current sense circuit 51. L14 and C35 are connected in parallel with one another between the dot side of the primary winding of T3 and PG. The secondary winding of T3 is center tapped, with the center tap being connected to chassis ground. The dot side of the secondary winding of T3 is connected to the autotune A input of the autotune circuit. The nondot side of the secondary winding of T3 is connected to the autotune B input of the autotune circuit via the primary winding of a second transformer (T5) that also forms part of the hereinafter described current sense circuit.

C34 and C35 in combination with L13 and L14 and the resonating capacitors of the hereinafter described autotune circuit, plus the supply loop, form a third order Gaussian bandpass filter having a center frequency at the switching frequency of the power supply and a bandwidth chosen to minimize amplitude and phase changes as the supply loop inductance changes. Gaussian approximation is utilized because of the slow change in phase that occurs near the center frequency and a lack of sensitivity to component value changes when compared with filters based on other concepts, such as Chebyshev, Butterworth, or Bessel approximations. Changes in supply loop inductance of up to 1:10 ratio, when autotuned, do not cause significant changes in third and higher order harmonic rejection. Further higher phase rate of change with respect to frequency (due to supply loop inductance changes) does not cause instability.

The output transformer, T3, allows current flow in the output filter and switches to be as low as possible while still achieving the required output power over line and load variations. The use of a balanced output transformer reduces EMI effects due to stray capacitance coupling between the supply loop and adjacent wiring. This transformer, i.e., T3, could be removed in applications that are not sensitive to harmonic interference. The use of T3 after the filter elements, i.e., after L13, L14, C34, and C35, allows a lower volt-second product value to be used and, as a result, reduces the weight of the output transformer core. Removing high-frequency content from the voltage applied to the primary winding of T3 eases the leakage inductance requirements of T3. Further, placing the filter on the secondary winding of T3, as opposed to the primary winding, would require the use of additional filter elements, which is expensive and, therefore, undesirable.

The current sense circuit 51 illustrated in FIG. 13 actually includes two current sense circuits; one circuit produces the I PH SENSE signal and the other produces the I SENSE signal. The circuit that produces the I PH SENSE signal comprises: the transformer previously designated T4; and a resistor designated R24. The nondot side of the primary winding of T4 is connected to power ground (PG). The dot side of the primary winding of T4 is connected to the nondot side of the primary winding of T3. Thus, T4 senses the current applied to the primary winding of T3. R24 is connected in parallel with the secondary winding of T4. The nondot side of the secondary winding of T4 is connected to signal ground (SG). The I PH SENSE signal is formed at the dot terminal of the secondary winding of T4. As will be readily appreciated from the foregoing description, I PH SENSE is a voltage signal whose phase and amplitude tracks current flow through the primary winding of T3, i.e., I PH SENSE has the same phase as the phase of the current component of the filtered PO SW.

The portion of current sense circuit 51 that produces the I SENSE signal includes: the transformer previously designated T5; two resistors designated R25 and R25A; four diodes designated D31, D32, D33, and D34; a capacitor designated 36; and an operational amplifier designated OA1. The nondot side of the primary winding of T5 is connected to the nondot side of the secondary winding of T3. The dot side of the primary winding of T5 forms the autotune B input that is applied to the autotune circuit in the manner described below. R25 is connected in parallel with the secondary winding of T5. The nondot side of the secondary winding of T5 is connected to the cathode of D31 and the anode of D32. The dot side of the secondary winding of T5 is connected to the cathode of D33 and the anode of D34. The anodes of D31 and D33 are connected to signal ground (SG). The cathodes of D32 and D34 are connected together and through C36 connected in parallel with R25A to signal ground. The cathodes of D32 and D34 are also connected to the noninverting input of OA1. The output of OA1 is connected to the inverting input of OA1. The I SENSE signal is formed at the output of OA1.

As will be readily appreciated by those skilled in the art from the foregoing description and viewing FIG. 13, the voltage across the secondary winding of T5 tracks the current applied to the autotune circuit and from there to the supply loop. D31 through D34 form a rectifier bridge that rectifies the voltage produced on the secondary winding of T5. R25 in combination with R25A and C36 reduce high-frequency noise from the rectified voltage. OA1 is a buffer that buffers the rectified, filtered voltage signal. Thus, I SENSE is a voltage-based signal whose magnitude tracks the current component of the power applied to the supply loop.

The voltage sense circuit 61 illustrated in FIG. 13 comprises: a transformer designated T6; and a resistor designated R26. The dot side of the primary winding of T6 is connected to the junction between C34, L14, C35, and the dot side of the primary winding of T3. The nondot side of the primary winding of TG is connected to power ground (PG). R26 is connected in parallel with the secondary winding of T6. The nondot side of the secondary winding of T6 is connected to signal ground (SG). The V PH SENSE signal is formed at the dot side of the secondary winding of T6. Thus, the V PH SENSE signal tracks the magnitude and phase of the voltage component of the filtered PO SW.

Figure 14:
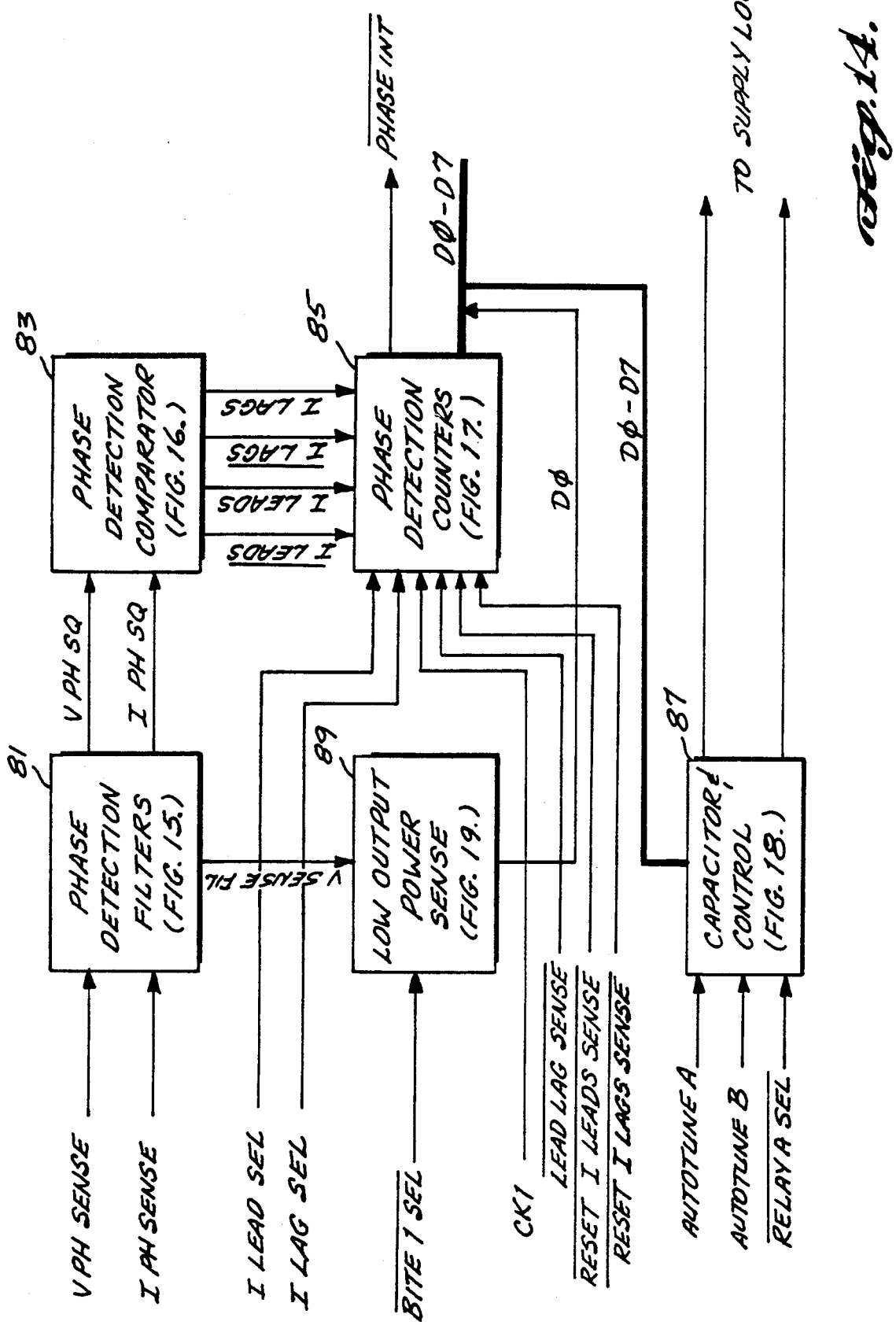
FIG. 14 is a block diagram of an autotune circuit suitable for use in the embodiment of the invention illustrated in FIG. 3.

FIG. 14 is a block diagram of an autotune circuit suitable for use in the embodiment of the invention illustrated in FIG. 3. The circuit illustrated in FIG. 14 includes: phase detection filters 81; a phase comparator 83; phase detection counters 85; a capacitor and control circuit 87; and a low output power sense circuit 89. The V PH SENSE and I PH SENSE signals produced by the voltage and current sense circuits illustrated in FIG. 13 and described above are applied to the phase detection filters 81. The phase detection filters 81 filter and square the V PH SENSE and I PH SENSE signals and create squared versions of these signals, which are designated V PH SQ and I PH SQ, respectively. The V PH SQ and I PH SQ signals are applied to the phase detection comparator 83. The phase detection comparator compares the phase of the V PH SQ and the I PH SQ signals and produces binary signals that indicate whether the current leads or lags the voltage, i.e., whether I PH SQ leads or lags V PH SQ, and the magnitude of the phase difference. More specifically, phase relationship signals produced by the phase detection comparator are designated I LEADS, $\overline{\text{I LEADS}}$, I LAGS, and $\overline{\text{I LAGS}}$. The I LEADS, $\overline{\text{I LEADS}}$, I LAGS, and $\overline{\text{I LAGS}}$ signals are all applied to the phase detection counters 85. The phase detection counters 85 include four counters that, as more fully described below, count CK1 clock pulses based on the binary states of the I LEADS, $\overline{\text{I LEADS}}$, I LAGS, and $\overline{\text{I LAGS}}$ signals and the duration of the binary states. The phase detection counters also include a pair of flip-flops whose states define whether the current is leading or lagging the voltage. At selected points in the count cycle a flip-flop that forms part of the phase detection counters produces a $\overline{\text{PHASE INT}}$ pulse, which causes the control circuit 63 to issue a $\overline{\text{LEAD LAG SENSE}}$ command that causes the flip-flop data denoting the leading or lagging current-voltage relationship to be applied to the data bus. Based on this information, the control circuit issues I LEAD SEL and I LAG SEL commands that cause the phase detection counters to apply a binary signal denoting the magnitude of the leading or lagging phase angle to the D0–D7 data bus. Thus, the $\overline{\text{LEAD LAG SENSE}}$, I LEADS SEL and I LAGS SEL commands produced by the control circuit control the reading of the information developed by the phase detection counters. $\overline{\text{RESET I LEADS SENSE}}$ and $\overline{\text{RESET I LAGS SENSE}}$ reset the lead/lag flip-flops.

The D0–D7 data bus is also connected to the capacitor and control circuit 87. The capacitor and control circuit also receives the autotune A and autotune B outputs of the output filter illustrated in FIG. 13 and described above. In addition, a control signal produced by the control circuit 63 designated $\overline{\text{RELAY A SEL}}$ is received by the capacitor and control circuit 87. The $\overline{\text{RELAY A SEL}}$ signal is an interrupt signal that causes the capacitor and control circuit 87 to "read" data on the D0–D8 data bus produced by the control circuit. In accordance with this data, relays that form part of the capacitor and control circuit are set. The setting of the relays controls the amount of capacitance connected in series with the supply loop and, thus, the resonance of the supplied power.

The low output power sense circuit 89 receives a $\overline{\text{BITE 1 SEL}}$ interrupt signal produced by the control circuit plus a V SENSE FIL signal produced by the phase detection filters 81 in the manner hereinafter described. The magnitude of the V SENSE FIL signal controls the binary state of a signal applied to the D0 line of the D0–D8 data bus for reading by the control circuit when a $\overline{\text{BITE 1 SEL}}$ interrupt pulse is produced by the control circuit.

Figure 15:
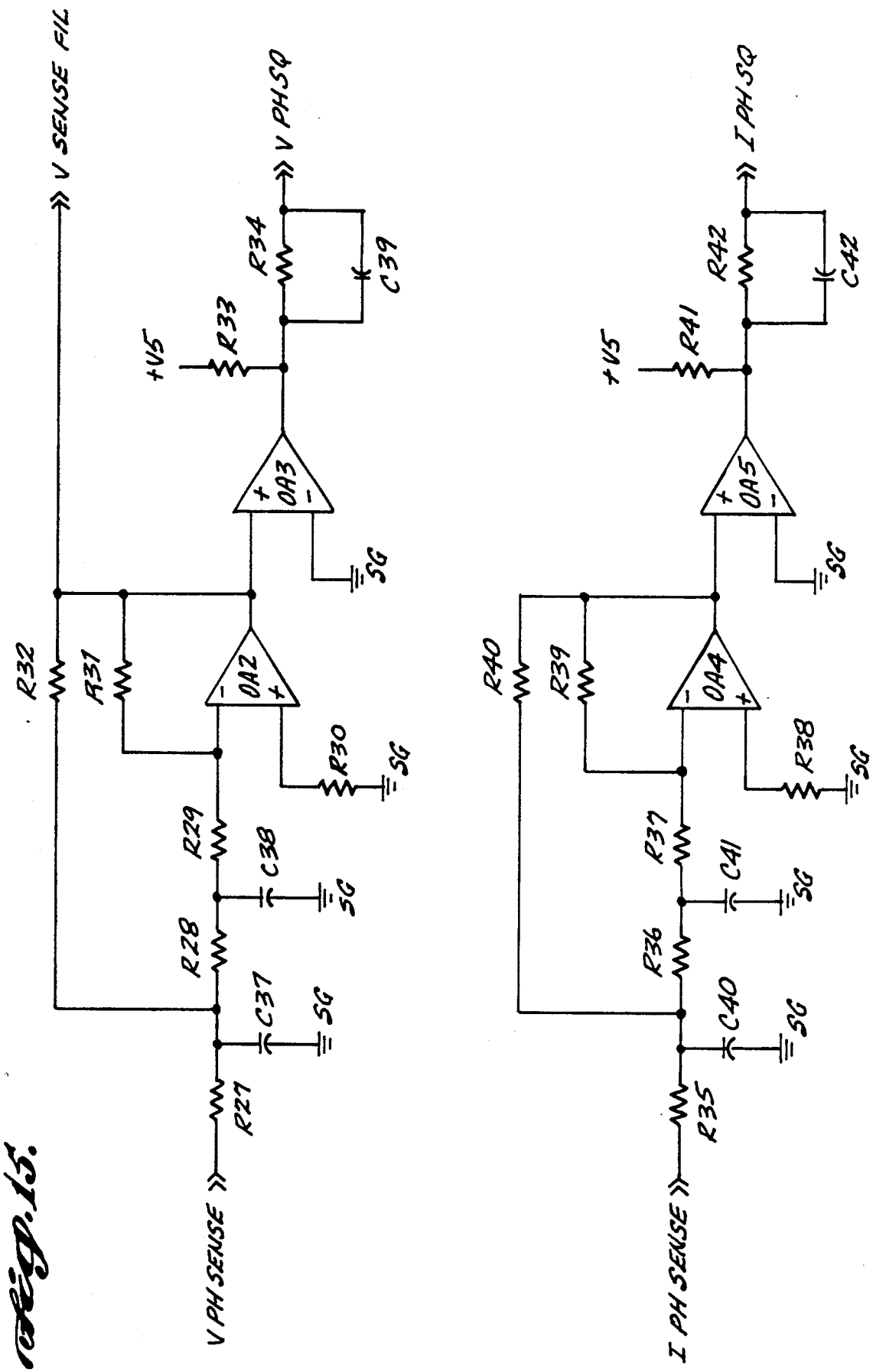
FIG. 15 is a schematic diagram of a phase detection filter circuit suitable for use in the autotune circuit illustrated in FIG. 14.

Phase detection filters suitable for use in the autotune circuit illustrated in FIG. 14 are illustrated in FIG. 15. The phase detection filters illustrated in FIG. 15 include a voltage filter and a current filter. The voltage filter comprises eight resistors designated R27–R34; three capacitors designated C37–C39; an operational amplifier designated OA2; and a comparator designated OA3. The V PH SENSE signal produced by the voltage sense circuit shown in FIG. 13 is applied through R27 connected in series with R28 and R29 to the inverting input of OA2. The noninverting input of OA2 is connected through R30 to signal ground (SG). The junction between R27 and R28 is connected through C37 to SG. The junction between R28 and R29 is connected through C38 to SG. The output of OA2 is connected through R31 to the inverting input of OA2. The output of OA2 is also connected through R32 to the junction between R27, C37 and R28. The output of OA2 is connected to the noninverting input of OA3. The inverting input of OA3 is connected to SG. The output of OA3 is connected through R33 to +V5. The output of OA3 is also connected to one end of R34 and C39. The other ends of R34 and C39 are connected together. The V PH SQ signal described above is formed at the junction between R34 and C39. The V SENSE FIL signal is formed at the output of OA2.

The current filter illustrated in FIG. 15 comprises eight resistors designated R35–R42; three capacitors designated R40–R42; an operational amplifier designated OA4; and a comparator designated OA5. The I PH SENSE signal produced by the current sense circuit (FIG. 13) is applied through R35 connected in series with R36 and R37 to the inverting input of OA4. The noninverting input of OA4 is connected through R38 to SG. The junction between R35 and R36 is connected through C40 to SG, and the junction between R36 and R37 is connected through C41 to SG. The output of OA4 is connected through R39 to the inverting input of OA4 and through R40 to the junction between R35, C40 and R36. The output of OA4 is also connected to the noninverting input of OA5. The inverting input of OA5 is connected to SG. The output of OA5 is connected through R41 to +V5. The output of OA5 is also connected to one end of R42 and one end of C42. The other ends of R42 and C42 are connected together. The I PH SQUARE signal is formed at the junction between R42 and C42.

OA2 and OA4 and their related components, namely, R27, R28, R29, R30, R31, R32, C37 and C38, and R35, R36, R37, R38, R39, R40, C40 and C41, form low pass filters. OA3 and OA5 and their related resistive components form zero crossing networks and level shift the outputs of OA2 and OA4, respectively. The end result is the production of square wave signals, namely, V PH SQ and I PH SQ, having the same phase relationship to one another as do the V PH SENSE and I PH SENSE signals. V SENSE FIL is a signal whose magnitude tracks the magnitude of V PH SENSE and, thus, the magnitude of the voltage component of the applied power.

Figure 16:
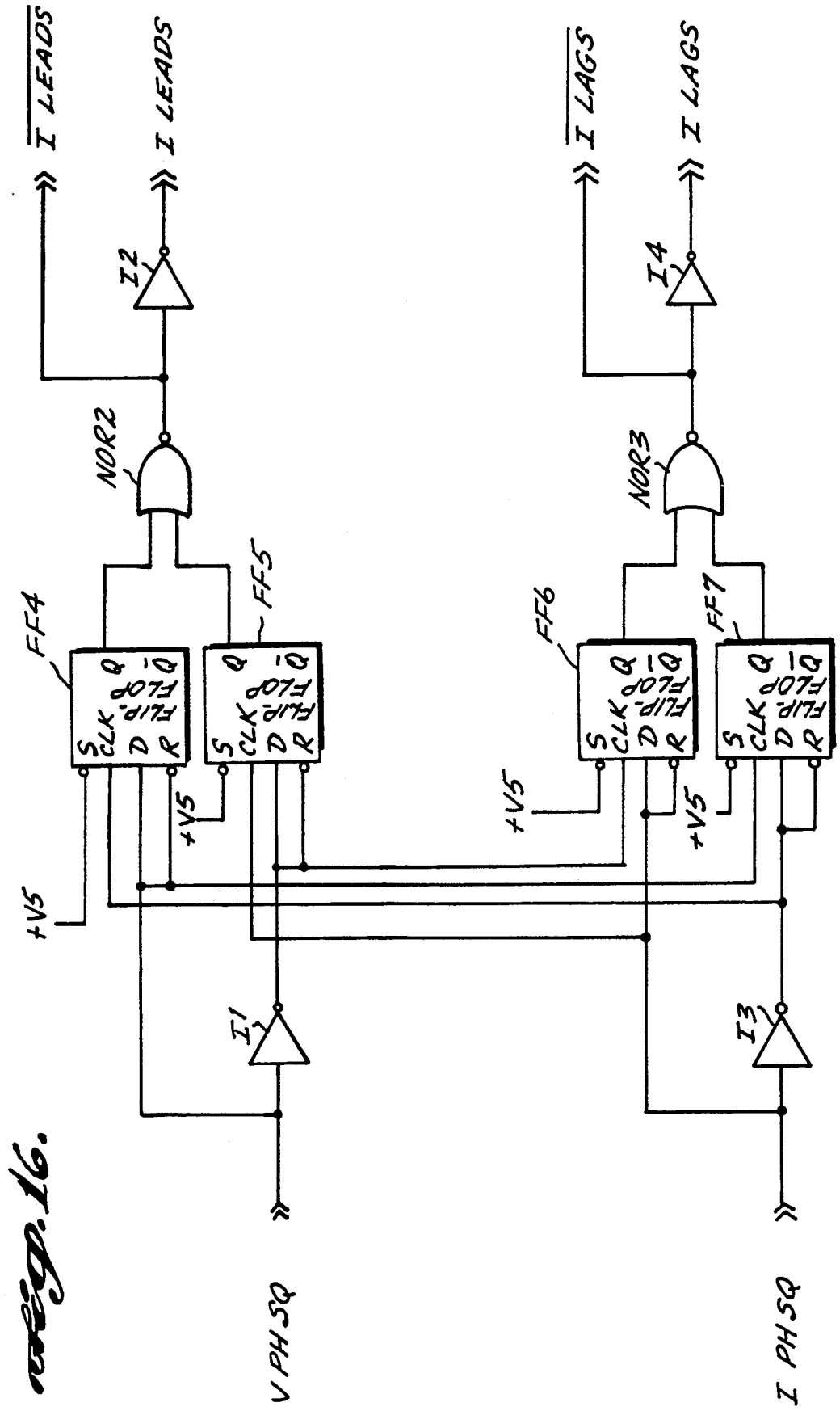
FIG. 16 is a schematic diagram of a phase detection comparator circuit suitable for use in the autotune circuit illustrated in FIG. 14.

FIG. 16 is a schematic diagram of a phase detection comparator suitable for use in the autotune circuit illustrated in FIG. 14. The phase detect comparator illustrated in FIG. 16 comprises: four D flip-flops designated FF4, FF5, FF6, and FF7; four inverters designated I1, I2, I3 and I3; and two two-input positive NOR gates designated NOR2 and NOR3. The set (S) inputs of all of FF4–FF7 are connected to +V5. The V PH SQ signal is applied to the input of I1, the D and R inputs of FF4, and the clock input of FF7. The output of I1 is applied to the D and R inputs of FF5 and the clock input of FF6. The I PH SQ signal is applied to the input of I3, the D and R inputs of FF6 and the clock input of FF5. The output of I3 is applied to the D and R inputs of FF7 and the clock input of FF4. As a result, the leading edge of a I PH SQ pulse causes FF5 to read $\overline{\text{V PH SQ}}$, the leading edge of a $\overline{\text{I PH SQ}}$ pulse causes FF4 to read V PH SQ, the leading edge of a V PH SQ pulse causes FF7 to read $\overline{\text{I PH SQ}}$, and the leading edge of a $\overline{\text{V PH SQ}}$ causes FF6 to read I PH SQ. The Q outputs of FF4 and FF5 are each connected to an input of NOR2. The output of NOR2 is connected to the input of I2. $\overline{\text{I LEADS}}$ is formed at the output of NOR2 and I LEADS is formed at the output of I2. The Q outputs of FF6 and FF7 are each connected to an input of NOR3. The output of NOR3 is connected to the input of I4. $\overline{\text{I LAGS}}$ is formed at the output of NOR3 and I LAGS is formed at the output of I4.

The clocking of FF4 and FF5 and FF6 and FF7 is such that if the current is leading the voltage, I LEADS and $\overline{\text{I LEADS}}$ will switch back and forth between high and low states with the duty cycle of the resulting wave depending upon the amount by which the current leads the voltage, i.e., the phase angle between the current and the voltage. A 50% duty cycle wave indicates a 90° phase angle. Under this condition, i.e., the current leading the voltage, I LAGS and $\overline{\text{I LAGS}}$ will be in steady states. I LAGS will be low and $\overline{\text{I LAGS}}$ will be high. Conversely, if the current lags the voltage, I LAGS and $\overline{\text{I LAGS}}$ will switch back and forth between high and low states, with the duty cycle of the resulting waves being dependent upon the amount by which the current is lagging the voltage. Under these conditions, i.e., the current lagging the voltage, I LEADS and $\overline{\text{I LEADS}}$ will be in steady states, with I LEADS being low and $\overline{\text{I LEADS}}$ being high. The current is considered lagging the voltage when the lagging phase angle falls between 0° and 180°. The current is considered to be leading the voltage when the leading phase angle falls between 0° and 180°, which is the same as a lagging phase angle being between 180° and 360°. Thus, all phase angles are covered.

Figure 17:
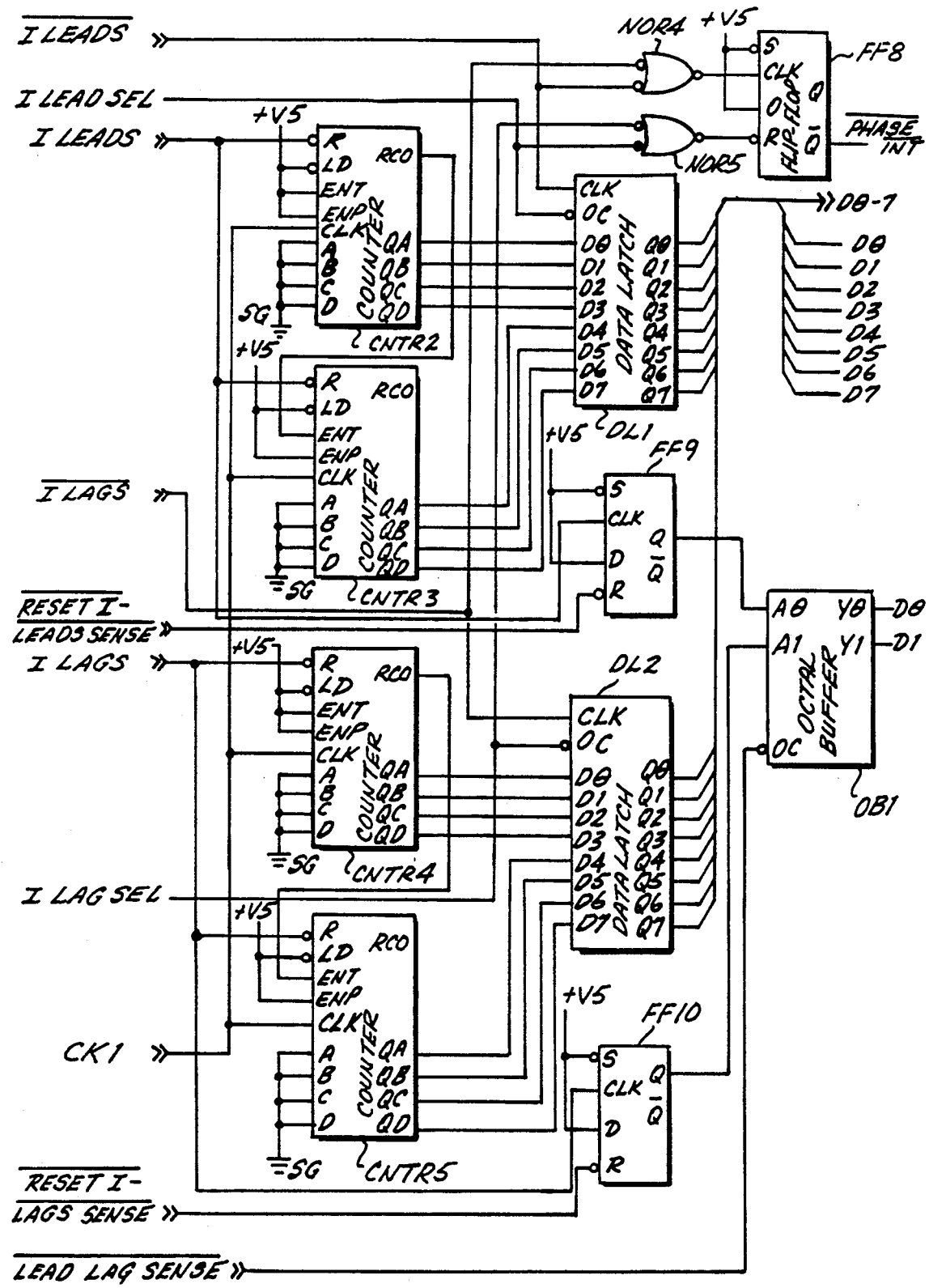
FIG. 17 is a schematic diagram of a phase detection counter circuit suitable for use in the autotune circuit illustrated in FIG. 14.

FIG. 17 is a schematic diagram of phase detection counters suitable for use in the autotune circuit illustrated in FIG. 14. The phase detection counters illustrated in FIG. 17 comprise four counters designated CNTR2, CNTR3, CNTR4, and CNTR5; two data latches designated DL1 and DL2; two negative OR gates designated NOR4 and NOR5; three D flip-flops designated FF8, FF9 and FF10; and a two-bit octal buffer designed OB1. While various counters can be used, in one actual embodiment of the invention, the chosen counter was an MM54HC163/MM74HC163 synchronous binary counter with synchronous clear produced by National Semiconductor. As shown in FIG. 17, this counter includes a reset (R) input, a load (LD) input, T and P enable inputs (ENT and ENP), a clock input (CLK), A, B, C and D inputs, a ripple carry output (RCO), and QA, QB, QC and QD outputs. Likewise, while various data latches can be utilized, in one actual embodiment of the invention, the chosen latch was a MM54HC374/MM74HC374 tri-state octal D-type flip-flop also produced by National Semiconductor. As illustrated in FIG. 17, such a latch includes a clock (CLK) input, an output control (OC) input, D0–D7 data inputs, and Q0–Q7 data outputs.

The $\overline{\text{I LEADS}}$ signal produced at the output of NOR2 (FIG. 16) is applied to one input of NOR4 and to the CLK input of DL1. The I LEAD SEL control signal produced by the control circuit 63 is applied to one input of NOR5 and the OC input of DL1. The I LEADS signal produced at the output of I2 is applied to the R inputs of CNTR2 and CNTR3 and to the clock (CLK) input of FF9. The $\overline{\text{I LAGS}}$ signal produced at the output of NOR3 is applied to the second input of NOR4 and to the CLK input of DL2. The I LAG SEL control signal produced by the control circuit 63 is applied to the second input of NOR5 and to the OC input of DL2. The I LAGS signal produced at the output of I4 is applied to the R inputs of CNTR4 and CNRT5 and to the clock (CLK) input of FF10. The LO and ENT inputs of CNTR2, CNTR3, CNTR4, and CNTR5 are all connected to +V5. The RCO output of CNTR2 is applied to the ENT input of CNTR3 and the RCO output of CNTR4 is applied to the ENT input of CNTR5. CK1 pulses are applied to the CLK inputs of CNTR2, CNTR3, CNTR4, and CNTR5. The A, B, C, and D inputs of CNTR2, CNTR3, CNTR4, and CNTR5 are all connected to signal ground.

The QA, QB, QC, and QD outputs of CNTR2 are applied to the D0, D1, D2 and D3 inputs, respectively, of DL1. The QA, QB, QC and QD outputs of CNTR3 are applied to the D4, D5, D6 and D7 inputs, respectively, of DL1. The QA, QB, QC and QD outputs of CNTR4 are applied to the D0, D1, D2 and D3 inputs, respectively, of DL2. The QA, QB, QC and QD outputs of CNTR5 are applied to the D4, D5, D6 and D7 inputs, respectively, of DL2. The Q0–Q7 outputs of DL1 and the Q0–Q7 outputs of DL2 are connected to data bus lines D0–D7, respectively. The output of NOR4 is connected to the CLK input of FF8. The set (S) and data (D) inputs of FF8 are connected to +V5. The output of NOR5 is connected to the reset (R) input of FF8. The $\overline{\text{Q}}$ output of FF8 forms the $\overline{\text{PHASE INT}}$ signal.

The S and D inputs of FF9 and FF10 are connected to +V5. The $\overline{\text{RESET I LEADS SENSE}}$ control signal produced by the control circuit 63 is applied to the R input of FF9 and the $\overline{\text{RESET I LAGS SENSE}}$ control signal produced by the control circuit is applied to the R input of FF10. The Q output of FF9 is applied to the A0 data input of OB1 and the Q output of FF10 is applied to the A1 data input of OB1. The Y0 and Y1 data outputs of OB1 are connected to data bus lines D0 and D1. Finally, the $\overline{\text{LEAD LAG SENSE}}$ control signal produced by the control circuit 63 is applied to the control (OC) input of OB1.

As will be recalled from the previous discussion of the phase detection comparator illustrated in FIG. 16, depending on the phase relationship between the voltage and current components of the power being applied to the supply loop, one or the other of I LEADS/$\overline{\text{I LEADS}}$ and I LAGS/$\overline{\text{I LAGS}}$ will be fluctuating. The other signals will be in a steady state. Assuming for purposes of discussion the current (I) is lagging the voltage (V), I LEADS and $\overline{\text{I LEADS}}$ will be in a steady state, with I LEADS being low and $\overline{\text{I LEADS}}$ being high. As a result of I LEADS being low, CNTR2 and CNTR3 will be held in a reset state and FF9 will not be clocked. Moreover, the steady high state of $\overline{\text{I LEADS}}$ will result in DL1 not being clocked. Consequently, DL1 will not latch any data produced by CNTR2 and CNTR3. Thus, in essence, the counter and latch system formed by CNTR2, CNTR3, and DL1 is disabled when the current is leading the voltage as is FF9. Contrariwise, CNTR4 and CNTR5 are periodically reset by the trailing edge of I LAGS pulses. These counters, i.e., CNTR4 and CNTR5, remain reset until the next I LAGS pulse occurs. When this happens CNTR4 begins counting pulses. At the same time, FF10 is clocked causing its Q output to shift high. At this point CNTR5 is disabled by the RCO output of CNTR4. Each time CNTR4 counts up to its maximum value, CNTR5 is enabled to count a pulse as a result of the RCO output of CNTR4 shifting low for a clock pulse period. The leading edge of an $\overline{\text{I LAGS}}$ pulse, which is coincident with the trailing edge of an I LAGS pulse, clocks DL2, causing the count values of CNTR4 and CNTR5 to be loaded into DL2. While stored in DL2, these count values, like the inputs of OB1, are not yet placed on the D0-D7 data bus because the signal applied to the OC input of DL2, i.e., I LAG SEL, is high. In addition to loading DL2, the leading edge of the $\overline{\text{I LAGS}}$ pulse clocks FF8 via NOR4. This causes the $\overline{\text{PHASE INT}}$ signal to shift to a low state. The low $\overline{\text{PHASE INT}}$ is read by the control circuit. In response, when time permits, the control circuit causes $\overline{\text{LEAD LAG SENSE}}$ to shift to a low state, resulting in the A0 and A1 data inputs of OB1 being applied to data lines D0 and D1. The state of D0 and D1 informs the controller of whether the voltage is leading or lagging the current. This information is stored in FF9 and FF10, based on which one of I LEADS/$\overline{\text{I LEADS}}$ and I LAGS/$\overline{\text{I LAGS}}$ is fluctuating. Based on the fact that D0 is low and D1 is high, the control circuit causes I LAG SEL to shift to a low state (after $\overline{\text{LEAD LAG SENSE}}$ returns to a high state). As a result, the data stored in DL2 is placed on the D0-D7 data bus and read by the control circuit. The I LAG SELECT shift from a high state to a low state also causes the output of NOR5 to shift from a high state to a low state, whereby FF8 is reset and the $\overline{\text{PHASE INT}}$ pulse terminated. A $\overline{\text{RESET I LAGS SENSE}}$ shift from a high state to a low state resets FF10.

The exact opposite situation occurs when the current component of the power applied to the supply loop is leading the voltage component. In this case, the steady states of $\overline{\text{I LAGS}}$ and I LAGS disable CNTR4, CNTR5, and DL2 and maintains FF10 reset. The I LEADS pulses enable CNTR2 and CNTR3 to count CK1 pulses and the $\overline{\text{I LEADS}}$ pulses latch the counts into DL1 for reading by the control circuit. The I LEADS pulse also clocks a high into FF9. Thus, when the control circuit causes $\overline{\text{LEAD LAG SENSE}}$ to shift low, a high is placed on the D0 data line and a low is placed on the D1 data line. As a result, I LEAD SEL rather than I LAG SEL shifts low to control the placing of latched (DL1) data on the data bus and the resetting of FF8 via NOR5. $\overline{\text{RESET I LEADS SENSE}}$ shifts low to reset FF9.

The control circuit 63 includes software that calculates a simple weighted running average of the phase difference data produced in the manner described above. A simple weighted average, in essence, constitutes a digital low pass filter with a single pole. Such a digital filter keeps phase measurement errors due to occasional noise mistriggering of the logic from causing large abnormal changes in phase difference values. The data is used to calculate a capacitor value that will reduce the phase difference to an acceptable level. The selected capacitive combination is controlled by applying a binary data word to the data bus, which is read by the capacitor and control circuit 87 in the manner next described. The capacitor and control circuit utilizes the binary data word to control the connection of compensating capacitance in series with the supply loop.

Figure 18:
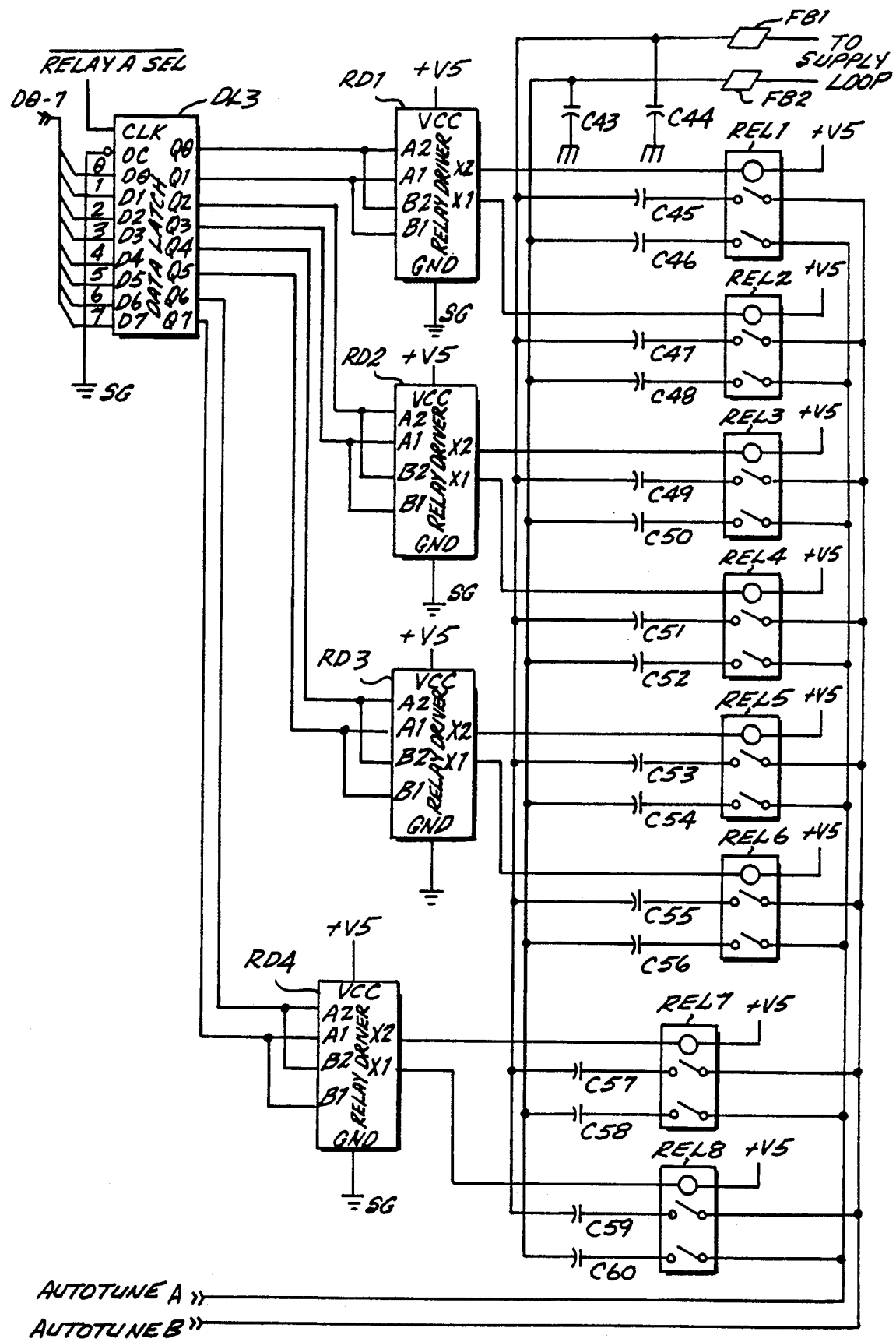
FIG. 18 is a schematic diagram of a capacitor and control circuit suitable for use in the autotune circuit illustrated in FIG. 14.

FIG. 18 is a schematic diagram of a capacitor and control circuit suitable for use in the autotune circuit illustrated in FIG. 14. The capacitor and control circuit illustrated in FIG. 18 includes an eight-bit data latch designated DL3; four relay drivers designated RD1, RD2, RD3, and RD4; eight relays designated REL1, REL2, REL3, REL4, REL5, REL6, REL7, and REL8; two filter capacitors designated C43 and C44; and sixteen compensation capacitors designated C45-C60; and two ferrite beads designated FB1 and FB2. While various data latches can be used, the data latch used in one actual embodiment of the invention is the MM54C374/MM74C374 tri-state octal D-type flip-flop produced by National Semiconductor. Similarly, while various relay drivers could be used, in one actual embodiment of the invention, the chosen relay driver was the DS3686 dual positive voltage relay driver also produced by National Semiconductor Corporation. The chosen octal D-type flip-flop (DL3) includes a clock (CLK) input, an output control (OC) input, eight data inputs designated D0-D7, and eight data outputs designated Q0-Q7. The relay drivers include A1, A2, B1, and B2 control inputs, and two outputs designated X1 and X2. X1 is responsive to the A1 and B1 inputs and X2 is responsive to the A2 and B2 inputs. Each of the relays REL1-REL8 includes a coil and two sets of normally open contacts.

The $\overline{\text{RELAY A SEL}}$ control signal produced by the control circuit is applied to the CLK input of DL3. The OC input of DL3 is connected to signal ground. As a result, data at the D0-D7 data inputs of DL3 is immediately and continuously available on the Q0-Q7 data outputs. The D0-D7 data bus lines are connected to the D0-D7 inputs, respectively, of DL3. The Q0 output of DL3 is connected to the A2 and B2 inputs of RD1, and the Q1 output of DL3 is connected to the A1 and B1 inputs of RD1. The Q2 output of DL3 is connected to the A2 and B2 inputs of RD3, and the Q3 output of DL3 is connected to the A1 and B1 inputs of RD3. The Q4 output of DL3 is connected to the A2 and B2 inputs of RD3, and the Q5 output of DL3 is connected to the A1 and B1 inputs of RD3. The Q6 output of DL3 is connected to the A2 and B2 inputs of RD4, and the Q7 output of DL3 is applied to the A1 and B1 inputs of RD4.

The power (VCC) terminals of RD1, RD2, RD3, and RD4 are connected to +V5, and the ground (GND) terminals of RD1, RD2, RD3, and RD4 are connected to signal ground (SG). The X2 output of RD1 is connected to one side of the coil of REL1, and the X1 output of RD1 is connected to one side of the coil of REL2. The X2 output of RD2 is connected to one side of the coil of REL3, and the X1 output of RD2 is connected to one side of the coil of REL4. The X2 output of RD3 is connected to one side of the coil of REL5, and the X1 output of RD3 is connected to one side of the coil of REL6. The X2 output of RD4 is connected to one side of the coil of REL7, and the X1 output of RD4 is connected to one side of the coil of REL8. The other sides of the coils of REL1-REL8 are all connected to +V5.

The AUTOTUNE A output of T3 is connected to one side of one of the sets of contacts of each of REL1-REL8. The AUTOTUNE B output (FIG. 13) is connected to one side of the other set of contacts of each of REL1-REL8. The other side of the sets of contacts are each connected through one of the compensation capacitors C45-C60 to one or the other of the sides of the supply loop, via FB1 and FB2, with one set of contacts of each relay being connected to one side and the other set of contacts being connected to the other side. For example, the contacts of REL1 connected to AUTOTUNE B are connected through C45 and FB1 to one side of the supply loop, and the contacts of REL1 connected to AUTOTUNE A are connected through C46 and FB2 to the other side of the supply loop. Finally, one side of the supply loop is connected through C43 to chassis ground, and the other side of the supply loop is connected through C44 to chassis ground.

In operation, the binary control data produced by the control circuit is latched into DL3 when DL3 is clocked by the $\overline{\text{RELAY A SEL}}$ signal making a low to high transition. The latched data, via RD1-RD4, control which ones of the coils of REL1-REL8 are energized. If the coils are energized, the respective contacts are closed, whereby the related capacitance is connected in series with the supply loop. As noted above, the amount of capacitance is determined by the phase difference between the current and voltage components of the power applied to the supply loop. The capacitance keeps the phase difference at an acceptable level, an acceptable level meaning that the supply loop power is substantially resonant.

Figure 19:
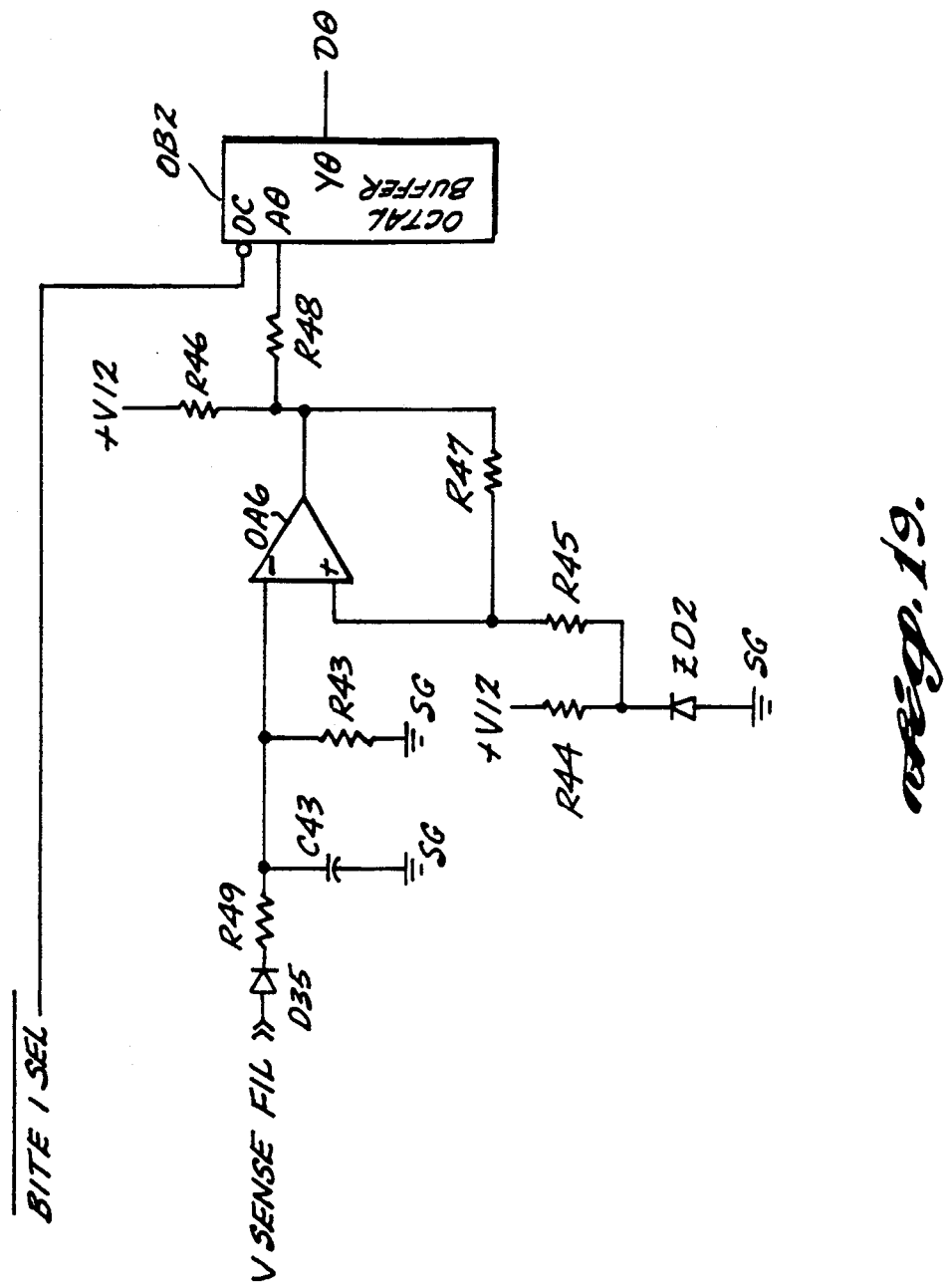
FIG. 19 is a schematic diagram of a low output power sensor circuit suitable for use in the autotune circuit illustrated in FIG. 14.

FIG. 19 is a schematic diagram of a low output power sense circuit suitable for use in the autotune circuit illustrated in FIG. 14 and described above. The low output power sense circuit illustrated in FIG. 19 comprises: a diode designated D35; a capacitor designated C43; seven resistors designated R43-R49; a unidirectional zener diode designated ZD2; a comparator designated OA6; and a one-bit octal buffer designated OB2. The one-bit octal buffer includes a control input (CO), a single data input designated AO, and a single data output designated YO. The V SENSE FIL signal produced by the phase detection filters (FIG. 15) in the manner described above is applied to the anode of D35. The cathode of D35 is connected through R49 to the inverting input of OA6. The inverting input of OA6 is also connected through C43 connected in parallel with R43 to signal ground (SG). The anode of ZD2 is connected to signal ground, and the cathode of ZD2 is connected through R44 to +V12. The junction between R44 and ZD2 is connected through R45 to the noninverting input of OA6. The output of OA6 is connected through R46 to +V12 and through R47 to the noninverting input of OA6. The output of OA6 is also connected through R48 to the AO input of OB2. The OC input of OB2 receives the $\overline{\text{BITE 1 SEL}}$ control signal produced by the control circuit. The YO output of OB2 is connected to one of the data bus lines, namely the D0 data bus line.

In operation, D35 rectifies the V SENSE FIL signal. The rectified signal is filtered by R49, C43 and R43, and OA6 compares the result with a fixed voltage determined by ZD2. As long as the magnitude of V SENSE FIL is above a predetermined value, the output of OA6 is low. If the magnitude of V SENSE FIL drops below the predetermined value (set by ZD2), the output of OA6 shifts high. Each time the $\overline{\text{BITE 1 SEL}}$ interrogation signal produced by the control circuit 63 shifts from high to low, the output of OA6 is loaded into OB2 and immediately made available on the D0 data bus line for reading by the control circuit. If the control circuit receives a binary high, indicating that the magnitude of V SENSE FIL has dropped below the predetermined value, the D0-D7 signal sent to the autotune circuit detunes the supply loop thereby raising the voltage on the secondary of the output transformer, T3. This keeps the minimum pulse width required by the load greater than that needed to maintain regulated output current—1.5$\mu$ sec in one actual embodiment of the invention. The supply loop is detuned so as to cause a positive phase shift in the control loop. When the load increases such that the magnitude of V SENSE FIL rises above a second predetermined value, the autotune circuit returns to the resonating mode described above. Positive feedback around OA6 creates the two different predetermined values.

As will be readily appreciated from the foregoing description, the invention provides a resonant, quasi-square wave, pulse width modulated power source suitable for use with a connectorless power system. The resonant, quasi-square wave, pulse width modulated power source supply supplies a constant amplitude, fixed-frequency current to the connectorless power system. The fixed frequency is controlled by a fixed-frequency pulse generator, i.e., an oscillator, that generates fixed-frequency sync pulses. The fixed-frequency sync pulses are applied to a pulse width modulator that produces fixed-frequency width modulated pulses in response thereto. A power switch receives relatively high-voltage DC power produced by a power supply and the width modulated pulses produced by the pulse width modulator. In accordance therewith, the power switch produces switched power pulses whose frequency and duration are controlled by the frequency and duration of the pulses produced by the pulse width modulator and whose magnitude is related to the magnitude of the relatively high-voltage DC power. A first current sensor senses the current component of the switched, filtered power pulses and produces a current sense signal whose magnitude is related thereto. The current sense signal is applied to the pulse width modulator to control the width of the pulses produced by the pulse width modulator such that the amplitude of the current component of the switched power pulses remain substantially constant. A second current sensor senses the current component of the switched power and produces a current phase signal whose phase tracks the phase of the current component of the switched, filtered power. A voltage sensor senses the voltage component of the switched power and produces a voltage phase signal whose phase tracks the phase of the voltage component of the switched power. The current and voltage phase signals are applied to an autotune system that produces a signal related to the phase difference between the current and voltage phase signals and, thus, the phase difference between the current and voltage components of the switched power. The autotune system includes a capacitor bank and a capacitor bank switch mechanism for controlling the application of capacitance to the output of the output filter so as to control the phase difference between the current and voltage components of the switched, filtered power. The autotune system also includes a control for controlling the capacitor bank switch in a manner that maintains the phase difference between the current and voltage phase signals and, thus, the phase difference between the current and voltage components of the switched, filtered power low.

While a preferred embodiment of the invention has been illustrated and described, it is to be understood that, within the scope of the appended claims, various changes can be made therein. Consequently, it is to be understood that the invention can be practiced otherwise than as specifically described herein.

The embodiments of the invention in which an exclusive property or privilege is claimed are defined as follows:

1. A resonant, quasi-square wave, pulse width modulated power source for supplying constant amplitude, fixed-frequency current, said resonant, quasi-square wave, pulse width modulated power source comprising:
    fixed-frequency pulse generating means for generating fixed-frequency sync pulses;
    pulse width modulation means coupled to said fixed-frequency pulse generating means for receiving said fixed-frequency sync pulses and producing fixed-frequency width modulated pulses in response thereto;
    power supply means for producing relatively high-voltage DC power;
    power switch means coupled to said pulse width modulator and to said power supply means for receiving said width modulated pulses produced by said pulse width modulator and said relatively high-voltage DC power produced by said power supply means and producing switched power pulses whose frequency and duration are controlled by the frequency and duration of the pulses produced by said pulse width modulator and whose magnitude is related to the magnitude of said relatively high-voltage DC power;
    first current sensing means for sensing the current component of said switched power pulses and producing a current sense signal whose magnitude is related thereto, said current sense signal being applied to said pulse width modulator to control the width of the pulses produced by said pulse width modulator such that the amplitude of the current component of said switched power pulses remain substantially constant;
    second current sensing means for sensing the current component of said switched power pulses and producing a current phase signal whose phase tracks the phase of the current component of said switched power pulses;
    voltage sensing means for sensing the voltage component of said switched power pulses and producing a voltage phase signal whose phase tracks the phase of said voltage component of said switched power pulses; and
    autotune means coupled to said second current sensing means and said voltage sensing means for receiving said current and voltage phase signals and producing a signal related to the phase difference therebetween and, thus, the phase difference between the current and voltage components of said switched power pulses, said autotune means including a capacitor bank and capacitor bank switching means for controlling the application of capacitance to the output of said power switching means and, thus, the phase difference between the current and voltage components of said switched power pulses, said autotune means also including control means for controlling said capacitor bank switching means so as to maintain the phase difference between said current and voltage phase signals and, thus, the phase difference between the current and voltage components of said switched power pulses low.

2. A resonant, quasi-square wave, pulse width modulated power source as claimed in claim 1, wherein:
    (a) said pulse width modulator means produces two fixed-frequency trains of alternately occurring pulses, each at one-half the frequency of said fixed-frequency sync pulses; and
    (b) said power switch means is connected to said pulse width modulator for receiving said two fixed-frequency pulse trains of alternately occurring pulses and producing in accordance therewith a positive switch pulse train, a negative switch pulse train and a ground switch pulse train, said positive switch pulse train coinciding with one of said two fixed-frequency pulse trains of alternately occurring pulses, said negative switch pulse train coinciding with the other of said two fixed-frequency pulse trains of alternately occurring pulses and said ground switch pulse train coinciding with the absence of either of said two fixed-frequency pulse trains of alternately occurring pulses.

3. A resonant, quasi-square wave, pulse width modulated power source as claimed in claim 2, wherein said power supply means produces relatively high-voltage positive DC power and relatively high-voltage negative DC power and wherein said switched power pulses include positive power pulses and negative power pulses, the production of said positive power pulses being controlled by said positive switch pulse train, said negative power pulses being controlled by said negative switch pulse train, and the absence of positive and negative power pulses being controlled by said ground switch pulse train.

4. A resonant, quasi-square wave, pulse width modulated power source as claimed in claim 3, wherein:
    (a) said power supply receives three-phase AC power;
    (b) said power supply includes an electromagnetic interference (EMI) line filter connected to receive said three-phase AC power and filters said three-phase AC power in a manner that prevents the operation of said resonant, quasi-square wave, pulse width modulated power source from affecting the three-phase AC power received by said power supply means; and (c) rectifier and filter capacitors for receiving said EMI line filtered three-phase AC power, converting said three-phase AC power into DC power and filtering said three-phase AC power to produce said positive and negative relatively high-voltage DC power.

5. A resonant, quasi-square wave, pulse width modulated power source as claimed in claim 4, wherein said power switch means comprises a power switch drive circuit and a power switch circuit, said power switch drive circuit receiving said two fixed-frequency pulse trains of alternately occurring pulses produced by said pulse width modulator and producing said positive switch pulse train, said negative switch pulse train and said ground switch pulse train, said power switch circuit connected to receive said relatively high-voltage positive and negative DC power and, in accordance with said positive switch pulse train, said negative switch pulse train and said ground switch pulse train produce said switched power pulses.

6. A resonant, quasi-square wave, pulse width modulated power source as claimed in claim 5, wherein said switch drive circuit includes a delay circuit for receiving said two fixed-frequency pulse trains of alternately occurring pulses produced by said pulse width modulator and controlling the leading edge of said positive switch pulse train, said negative switch pulse train and said ground switch pulse train such that the leading edges of said positive and negative switch pulse trains are delayed by a predetermined amount from the leading edges of said two fixed-frequency pulse trains of alternately occurring pulses and the leading edge of said ground switch pulse trail is delayed by a predetermined amount from the trailing edges of said two fixed-frequency pulse trains of alternately occurring pulses.

7. A resonant, quasi-square wave, pulse width modulated power source as claimed in claim 6, wherein:

(a) said switch drive circuit also includes isolated power supply means connected to receive AC power from said power supply means and produce DC power isolated from the relatively high positive and negative DC voltages produced by said power supply means; and (b) said switch drive circuit includes drive means connected to receive said isolated DC power and said positive delay, negative delay and ground delay pulse trains and, in accordance therewith, produce said positive, negative and ground switch pulse trains.

8. A resonant, quasi-square wave, pulse width modulated power source as claimed in claim 7, including filtering means connected to said power switch means for filtering said switched power pulses in a manner that minimizes amplitude and phase changes as the inductance of the load connected to said quasi-square wave, pulse width modulated power source changes.

9. A resonant, quasi-square wave, pulse width modulated power source as claimed in claim 8, wherein said filter means is a Gaussian bandpass filter whose topology includes the inductance of said load and the capacitance applied to the output of said power switching means by said autotune circuit.

* * * * *

UNITED STATES PATENT AND TRADEMARK OFFICE
CERTIFICATE OF CORRECTION

PATENT NO. : 5,006,973
DATED : April 9, 1991
INVENTOR(S) : J.B. Turner It is certified that error appears in the above-identified patent and that said Letters Patent is hereby corrected as shown below:

| COLUM | LINE | |
|---|---|---|
| 11 | 68 | Delete "Q0/Q0" and insert therefor --Q0/$\overline{Q0}$-- |
| 11 | 68 | Delete "Q1/Q1" and insert therefor --Q1/$\overline{Q1}$-- |
| 11 | 68 | Delete "Q2/Q2" and insert therefor --Q2/$\overline{Q2}$-- |
| 11 | 68 | Delete "Q3/Q3" and insert therefor --Q3/$\overline{Q3}$-- |
| 12 | 1 | Delete "Q3/Q3" and insert therefor --Q3/$\overline{Q3}$-- |
| 17 | 48 | Delete "I LEADS" (second occurrence) and insert therefor --$\overline{\text{I LEADS}}$-- |
| 17 | 48 | Delete "I LAGS" (second occurrence) and insert therefor --$\overline{\text{I LAGS}}$-- |
| 19 | 22 | Delete "and I3" and insert therefor --and I4-- |
| 25 | 15 | Before "output" (second occurrence) insert --power-- |

Signed and Sealed this

Twenty-sixth Day of January, 1993

Attest:

STEPHEN G. KUNIN

Attesting Officer

Acting Commissioner of Patents and Trademarks